United States Patent
Liu et al.

(10) Patent No.: US 12,498,323 B2
(45) Date of Patent: Dec. 16, 2025

(54) USE OF FLUORESCENT IMAGING PLATE READER (FLIPR) HIGH-THROUGHPUT REAL-TIME FLUORESCENCE DETECTION AND ANALYSIS SYSTEM IN DETECTION OF CALCIUM SIGNALS IN PLANTS

(71) Applicant: Guizhou Normal University, Guiyang (CN)

(72) Inventors: Jie Liu, Guiyang (CN); Yin Yi, Guiyang (CN); Jiyi Gong, Guiyang (CN); Ming Tang, Guiyang (CN); Ximin Zhang, Guiyang (CN); Yuke Li, Guiyang (CN); Yubin Zhang, Guiyang (CN)

(73) Assignee: Guizhou Normal University, Guiyang (CN)

( * ) Notice: Subject to any disclaimer, the term of this patent is extended or adjusted under 35 U.S.C. 154(b) by 568 days.

(21) Appl. No.: 18/062,699

(22) Filed: Dec. 7, 2022

(65) Prior Publication Data
US 2023/0408412 A1    Dec. 21, 2023

(30) Foreign Application Priority Data
May 25, 2022 (CN) .......................... 202210583073.2

(51) Int. Cl.
*G01N 21/64* (2006.01)
*C12N 5/04* (2006.01)
*G01N 21/01* (2006.01)

(52) U.S. Cl.
CPC ............. *G01N 21/643* (2013.01); *C12N 5/04* (2013.01); *G01N 21/01* (2013.01)

(58) Field of Classification Search
CPC ... G01N 2021/7769; G01N 2021/8466; G01N 21/01; G01N 21/643; G01N 21/6452; C12N 5/04
See application file for complete search history.

(56) References Cited

FOREIGN PATENT DOCUMENTS

WO    WO-2018209209 A1 * 11/2018 ........... C07K 14/415

\* cited by examiner

*Primary Examiner* — Jennifer Wecker
(74) *Attorney, Agent, or Firm* — Bryan D. Zerhusen, Esq.; Nicholas R. Herrel, Esq.; CANTOR COLBURN LLP

(57) ABSTRACT

The present disclosure provides the use of a fluorescent imaging plate reader (FLIPR) high-throughput real-time fluorescence detection and analysis system in detection of calcium signals in plants, which successfully applies the FLIPR to the detection of calcium signals in plants, and increases the use of the FLIPR in the detection of calcium signals in plants. In addition, a method for detecting calcium signals in plants based on FLIPR provided by the present disclosure detects changes in calcium signals generated by stimulation of plants by an exogenous calcium signal $CaCl_2$ solution, which is the basis of high-throughput real-time fluorescence detection of calcium ions in plants.

20 Claims, 30 Drawing Sheets

USE OF FLUORESCENT IMAGING PLATE READER (FLIPR) HIGH-THROUGHPUT REAL-TIME FLUORESCENCE DETECTION AND ANALYSIS SYSTEM IN DETECTION OF CALCIUM SIGNALS IN PLANTS

CROSS REFERENCE TO RELATED APPLICATION

This patent application claims the benefit of and priority to Chinese Patent Application No. 202210583073.2, filed on May 25, 2022, the disclosure of which is incorporated by reference herein in its entirety as part of the present application.

TECHNICAL FIELD

The present disclosure belongs to the technical field of plant cell detection, and in particular, to use of a fluorescent imaging plate reader (FLIPR) high-throughput real-time fluorescence detection and analysis system in detection of calcium signals in plants.

BACKGROUND

The FLIPR TETRA is the latest high-throughput charge-coupled device (CCD) imaging plate reader introduced by Molecular Devices. It is an instrument perfectly integrating a liquid charging system and a detection system, and the only G-protein coupled receptor (GPCR) quantitative detection instrument perfectly combining high throughput and high quality in the current. The FLIPR TETRA is used to detect GPCR receptors and ion channel activity, enabling reliable, flexible, and high-throughput screening of lead compounds in the early stage of drug screening.

At present, the application of FLIPR around the world is limited to medical and animal fields such as myocardial hypoxia injury, the detection of the effect of drugs on the change of intracellular calcium concentration by the FLIPR Calcium 4 Assay kit, the detection of the inhibition of compounds on calcium elevation in CHO cells with high expression of endothelin receptors activated by endothelin-1 (ET-1) by the FLIPR calcium analysis method, and screening of ion channel structure and function, and there are few reports in the plant field.

Calcium, as a second messenger in plants, is widely involved in signal transduction of plants in response to various abiotic and biotic stresses. Plant cells can respond to external environmental changes using intracellular calcium ions as a medium. After perceiving changes in the extracellular environment, the plant cells encode specific "calcium fingerprints", which are recognized by intracellular calcium ion receptors and initiate various downstream physiological responses through the "decoding" process to respond to environmental changes. For many years, the related research on calcium signals and their effects on plant development and physiological and biochemical processes have been the focus of research in this field. Therefore, in this field, it is necessary to develop a method for detecting calcium signals in plants to promote related research on the calcium signals in plants.

SUMMARY

An objective of the present disclosure is to provide use of an FLIPR high-throughput real-time fluorescence detection and analysis system in detection of calcium signals in plants. The present disclosure successfully applies the FLIPR to the detection of calcium signals in plants, which is the basis of high-throughput real-time fluorescence detection of calcium ions in plants.

The present disclosure provides use of an FLIPR high-throughput real-time fluorescence detection and analysis system in detection of calcium signals in plants. The plants include *Primula* plants, *Valeriana* plants, *Nicotiana* plants, and *Arabidopsis* plants.

Preferably, the *Primula* plants may include primula, the *Valeriana* plants may include valerian, the *Nicotiana* plants may include tobacco, and the *Arabidopsis* plants may include arabidopsis.

The present disclosure further provides a sample pretreatment method for detecting calcium signals in plants based on FLIPR, including the following steps:
  mixing plant protoplasts with a calcium dye to obtain a first mixture; and
  mixing the first mixture with a calcium signal chelator and an exogenous calcium signal stimulation solution, and conducting incubation and first centrifugation on an obtained second mixture to obtain a sample to be loaded.

Preferably, the plant protoplasts and the calcium dye may have a volume ratio of (0.1-10):(0.5-5).

Preferably, the calcium signal chelator may include one or more selected from the group consisting of an ethylene glycol tetraacetic acid (EGTA) solution, ethylenediamine, and 2,2'-bipyridine. The exogenous calcium signal stimulation solution may include one or more selected from the group consisting of a $CaCl_2$ solution, a $CaCO_3$ solution, and a $Ca_2NO_3$ solution.

Preferably, when the calcium signal chelator is the EGTA solution and the exogenous calcium signal stimulation solution is the $CaCl_2$ solution, a total volume of the EGTA solution and the $CaCl_2$ solution and a volume of the first mixture may have a ratio of (0.1-6):(1-15).

Preferably, the EGTA solution may have a molar concentration of 5-200 μM. The $CaCl_2$ solution may have a molar concentration of 220-450 mM.

Preferably, a method for extracting the plant protoplasts may include the following steps:
  mixing plant tissues with a lysis buffer, lysing for 5-7 h, and conducting filtration and second centrifugation to obtain a plant tissue lysate;
  mixing the plant tissue lysate with a cell protoplast washing (CPW) lotion with a mass concentration of 5-20%, and conducting third centrifugation to obtain a protoplast lotion mixture; and
  placing the protoplast lotion mixture on a surface of a sucrose solution with a mass concentration of 0.5-50%, and conducting fourth centrifugation to obtain the plant protoplasts, where
  the plant tissues and the lysis buffer may have a mass/volume ratio of (0.1-10) g:(1.0-30) mL.

Preferably, the lysis buffer may include the following components:
  1% of cellulase, 1% of pectinase, 0.7 mol/L of mannitol, 0.7 mmol/L of $KH_2PO_4$, and 10 mmol/L of $CaCl_2 \cdot 2H_2O$, and the lysis buffer has a pH of 6.8-7.0.

The present disclosure further provides a method for detecting calcium signals in plants based on FLIPR. The sample to be loaded obtained by the sample pretreatment method according to the above technical solutions is loaded on the machine, and the FLIPR high-throughput real-time fluorescence detection and analysis system is used to detect calcium signals in the sample to be loaded.

The present disclosure provides the use of an FLIPR high-throughput real-time fluorescence detection and analysis system in detection of calcium signals in plants, which successfully applies the FLIPR to the detection of calcium signals in plants, and increases the use of the FLIPR in the detection of calcium signals in plants.

In addition, the present disclosure provides the sample pretreatment method for detecting calcium signals in plants based on FLIPR. Based on the FLIPR, changes in calcium signals generated by stimulation of plants by an exogenous calcium signal $CaCl_2$ solution are detected, which is the basis of high-throughput real-time fluorescence detection of calcium ions in plants.

BRIEF DESCRIPTION OF THE DRAWINGS

To explain the technical solutions in examples of the present disclosure or in the prior art more clearly, the accompanying drawings required in the examples will be described below in brief.

DETAILED DESCRIPTION

Figure 1:
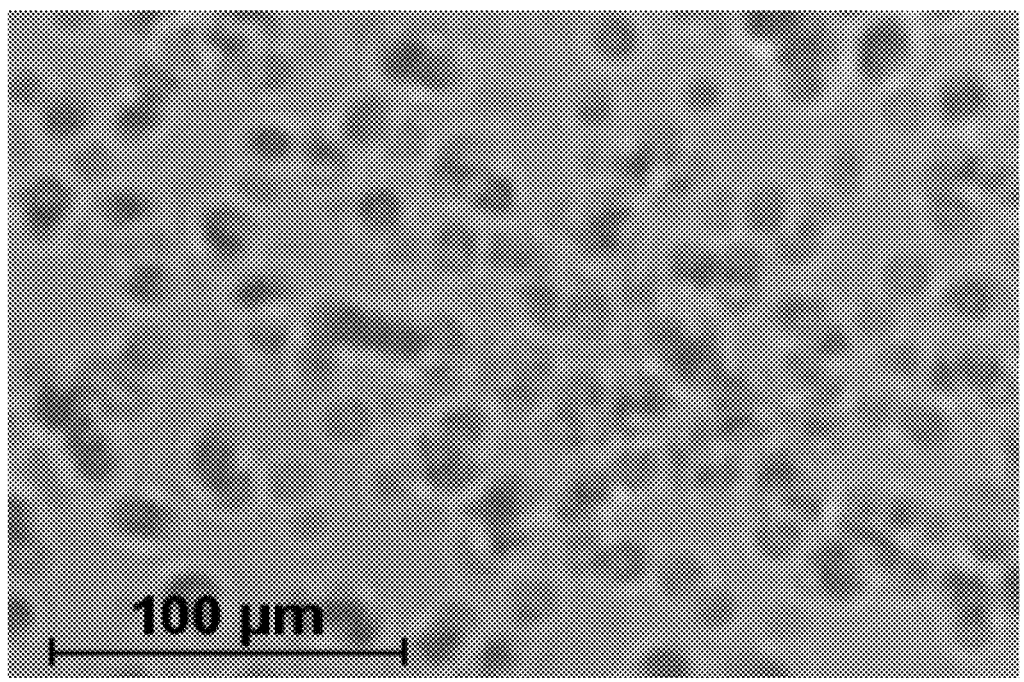
FIG. 1 is a protoplast map of *Primula rupestris* leaves.

The present disclosure provides use of a fluorescent imaging plate reader (FLIPR) high-throughput real-time fluorescence detection and analysis system in detection of calcium signals in plants. The plants include *Primula* plants, *Valeriana* plants, *Nicotiana* plants, and *Arabidopsis* plants.

The *Primula* plants of the present disclosure preferably include primula, more preferably *Primula rupestris*. The *Valeriana* plants preferably include valerian. The *Nicotiana* plants preferably include tobacco, more preferably *Nicotiana rustica* and *Nicotiana tobacun*. The *Arabidopsis* plants preferably include arabidopsis. The present disclosure successfully applies the FLIPR to the detection of calcium signals in plants, provides a new detection tool and method for the detection of calcium signals in plants, and increases the use of the FLIPR in the detection of calcium signals in plants.

The present disclosure further provides a sample pretreatment method for detecting calcium signals in plants based on FLIPR, including the following steps.

Plant protoplasts are mixed with a calcium dye to obtain a first mixture.

The first mixture is mixed with a calcium signal chelator and an exogenous calcium signal stimulation solution, and incubation and first centrifugation are conducted on an obtained second mixture to obtain a sample to be loaded.

The present disclosure preferably further provides extracting the plant protoplasts before mixing the plant protoplasts with the calcium dye. In the present disclosure, a method for extracting the plant protoplasts includes the following steps. Plant tissues are mixed with a lysis buffer and lysed, and filtration and second centrifugation are conducted to obtain a plant tissue lysate. The plant tissue lysate is mixed with a CPW lotion with a mass concentration of 5-20%, and third centrifugation is conducted to obtain a protoplast lotion mixture. The protoplast lotion mixture is placed on a surface of a sucrose solution with a mass concentration of 0.5-50%, and fourth centrifugation is conducted to obtain the plant protoplasts. The plant tissues and the lysis buffer have a mass/volume ratio of (0.1-10) g:(1.0-30) mL.

In the present disclosure, the plant tissues are preferably mixed with the lysis buffer and lysed to obtain the plant lysis mixture. Before mixing the plant tissues with lyase liquid, the method preferably further includes crushing the plant tissues into strip tissues, and the strip tissues preferably have a width of 0.5 cm. The plant tissue of the present disclosure is preferably one or more selected from the group consisting of leaves, petals, and sepals, and when the selected plants are different, the selected tissues are also slightly different. When the plant is a *Primula* plant, the tissues preferably include one or more selected from the group consisting of leaves, petals, and sepals. When the plant is a *Valeriana* plant, the tissues are preferably leaves. The mass of the plant tissues of the present disclosure and a volume of the lysis buffer have a ratio of (0.1-10) g:(1.0-30) mL, preferably 5 g:15 mL. The lysis buffer of the present disclosure is preferably lyase liquid. The lyase liquid preferably includes the following components: 1% of cellulase, 1% of pectinase, 0.7 mol/L of mannitol, 0.7 mmol/L of $KH_2PO_4$, and 10 mmol/L of $CaCl_2 \cdot 2H_2O$, and the lysis buffer has a pH of preferably 6.8-7.0, more preferably 6.8. The lysis in the present disclosure is preferably oscillation lysis, and the oscillation lysis is conducted at a rotational speed of preferably 50-150 rpm, more preferably 65 rpm. The lysis in the present disclosure is preferably conducted under dark conditions to ensure the activity of the lyase. The lysis is conducted at preferably 25-28° C., more preferably 27° C., for preferably 5-7 h, more preferably 6 h.

After the plant lysis mixture is obtained, the present disclosure preferably uses a 50-300 mesh filter screen to filter the plant lysis mixture to obtain the plant lysis buffer. The filter screen has an aperture of more preferably 200 meshes. The filtration can remove plant tissue residues that are not digested by lysis.

After the plant lysis buffer is obtained, the present disclosure preferably conducts second centrifugation on the plant lysis buffer, and discards the supernatant to obtain the plant tissue lysate. The second centrifugation in the present disclosure is conducted at a rotational speed of preferably 300-1,000 rpm, more preferably 600 rpm, at preferably 0-10° C., more preferably 4° C., for preferably 3-10 min, more preferably 5 min.

After the plant tissue lysate is obtained, the present disclosure preferably mixes the plant tissue lysate with the CPW lotion with a mass concentration of 5-20%, and conducts third centrifugation to obtain the protoplast lotion mixture. In the present disclosure, the CPW lotion has a mass concentration of preferably 13%. In the present disclosure, a mass of the plant tissue lysate and a volume of the CPW lotion have a ratio of preferably (0.5-2) g:(0.5-20) mL, more preferably 1 g:15 mL. The third centrifugation in the present disclosure is conducted at the same temperature and rotational speed as the second centrifugation, and will not be repeated here. The third centrifugation is conducted for preferably 1-5 min, more preferably 3 min. The present disclosure preferably discards ¾ volume of the CPW lotion in the mixture after the third centrifugation, that is, ¼ of the initial addition volume of the CPW lotion is retained to obtain the protoplast lotion mixture.

After the protoplast lotion mixture is obtained, the present disclosure preferably places the protoplast lotion mixture on the surface of the sucrose solution with a mass concentration of 0.5-50%, and conducts fourth centrifugation to obtain the plant protoplasts. The sucrose solution of the present disclosure has a mass concentration of preferably 10-35%, more preferably 20%. The sucrose solution of the present disclosure and the CPW lotion in the protoplast lotion mixture have a volume ratio of preferably (0.5-5):1, more preferably 3:1. In the present disclosure, the action of placing the protoplast lotion mixture on the surface of the sucrose solution needs to be slow, in order to prevent the protoplast from breaking. The fourth centrifugation in the present disclosure is conducted at the same rotational speed and temperature as the second centrifugation, and will not be repeated here. The fourth centrifugation is conducted for preferably 3-15 min, more preferably 7 min. The plant protoplasts after the fourth centrifugation of the present disclosure are located at the bottom of the device for centrifugation. The obtained plant protoplasts are stored at 4° C. for 2-3 d.

After the plant protoplasts are obtained, the present disclosure mixes the plant protoplasts with the calcium dye to obtain the first mixture. In the present disclosure, the plant protoplasts and the calcium dye have a volume ratio of preferably (0.1-10):(0.5-5), more preferably (0.5-3.5):(0.7-2.5), and further preferably 1:1. The calcium dye of the present disclosure is preferably a commercially available calcium dye, more preferably a Calcium 6 Assay kit produced by Sigma.

After the first mixture is obtained, the present disclosure mixes the first mixture with the calcium signal chelator and the exogenous calcium signal stimulation solution, and conducts the incubation and the first centrifugation on the obtained second mixture to obtain the sample to be loaded. The calcium signal chelator of the present disclosure preferably includes one or more selected from the group consisting of an EGTA solution, ethylenediamine, and 2,2'-bipyridine, more preferably the EGTA solution. The exogenous calcium signal stimulation solution preferably includes one or more selected from the group consisting of a $CaCl_2$ solution, a $CaCO_3$ solution, and a $Ca_2NO_3$ solution, more preferably the $CaCl_2$ solution. When the calcium signal chelator is preferably the EGTA solution and the exogenous calcium signal stimulation solution is preferably the $CaCl_2$ solution, a total volume of the EGTA solution and the $CaCl_2$ solution and a volume of the first mixture have a ratio of preferably (0.1-6):(1-15), more preferably 2:3. As in the examples of the present disclosure, the first mixture has a volume of 150 μL, and the EGTA solution and the $CaCl_2$ solution have a total volume of 100 μL. In the present disclosure, the EGTA solution and the $CaCl_2$ solution have a volume ratio of (1-9):(1-9), more preferably 1:1. In the present disclosure, the EGTA solution has a molar concentration of preferably 5-200 μM, more preferably 200 μM. The $CaCl_2$ solution has a molar concentration of preferably 220-450 mM, more preferably 220 mM. The solvent for preparing the EGTA solution and the $CaCl_2$ solution in the present disclosure is preferably a helps buffer. The incubation in the present disclosure is conducted at preferably 25-40° C., more preferably 37° C., for preferably 0.5-3 h, more preferably 1 h. The first centrifugation in the present disclosure is conducted at the same rotational speed and temperature as the second centrifugation. The first centrifugation is conducted for preferably 1-2 min.

The present disclosure further provides a method for detecting calcium signals in plants based on FLIPR. The sample to be loaded obtained by the sample pretreatment method according to the above technical solutions is loaded on the machine, and the FLIPR high-throughput real-time fluorescence detection and analysis system is used to detect calcium signals in the sample to be loaded.

The present disclosure does not have a special limitation on the parameters of the machine, which can be set conventionally based on the operation instructions of the FLIPR.

In order to further illustrate the present disclosure, the technical solutions provided by the present disclosure are described in detail below in connection with accompanying drawings and examples, but these examples should not be understood as limiting the claimed scope of the present disclosure.

EXAMPLE 1

A method for extracting protoplasm from *Primula rupestris* leaves was composed of the following steps.

Extraction of protoplasm from *Primula rupestris* leaves:
(1) 2 pieces (5 g) of young leaves of *Primula rupestris* were cut into 0.5 cm slender strips, and placed in 15 mL lyase liquid and a shaker at 65 rpm at 25-28° C. for enzymolysis for 5-7 h under dark conditions.

The composition of the lyase liquid was: 1% of cellulase, 1% of pectinase, 0.7 mol/L of mannitol, 0.7 mmol/L of $KH_2PO_4$, and 10 mmol/L of $CaCl_2 \cdot 2H_2O$, and the lysis buffer had a pH of 6.8-7.0.

solutions: $CaCl_2$ (0, 10, 20, 40, 60, 80, 100, 150, 200, 300, and 500 mM). A group without adding protoplasts was taken as a control group. The $CaCl_2$ solution had a volume of 100 μL and the specific settings are shown in Table 2:

TABLE 2

| | 1 | 2 | 3 | 4 | 5 | 6 | 7 | 8 | 9 | 10 | 11 | 12 |
|---|---|---|---|---|---|---|---|---|---|---|---|---|
| | Cell plate settings for different concentrations of $CaCl_2$ solutions ||||||||||||
| A | 100 μL Buffer | 10 mM | 20 mM | 40 mM | 60 mM | 80 mM | 100 mM | 150 mM | 200 mM | 300 mM | 500 mM | Cell Free 100 mM |
| B | | | | | | | | | | | | |
| C | | | | | | | | | | | | |
| D | | | | | | | | | | | | |
| E | | | | | | | | | | | | |
| F | | | | | | | | | | | | |
| G | | | | | | | | | | | | |
| H | | | | | | | | | | | | |

(2) After enzymolysis, a 200-mesh filter screen was used for filtration to remove incompletely digested residues.

(3) The remaining solution was centrifuged at 600 rpm at 4° C. for 5 min, and the supernatant was discarded.

(4) 1.6 mL of a 13% CPW lotion was added, and centrifuged at 600 rpm at 4° C. for 3 min, and the supernatant was discarded. 0.4 mL of the lotion needed to be kept.

(5) The lotion mixed with the protoplasts was gently added on a surface of a 20% sucrose solution (13% CPW: 20% sucrose=1:3).

(6) Centrifugation was conducted at 600 rpm at 4° C. for 7 min, and the protoplasts were located at the bottom of a centrifuge tube, and could be stored in the refrigerator at 4° C. for 2-3 d.

The extracted protoplasts of the *Primula rupestris* leaves were observed under a fluorescence microscope, and the results are shown in FIG. 1.

It can be seen from FIG. 1 that the extracted protoplasts of the *Primula rupestris* leaves are approximately circular, with a large number and few fragments.

EXAMPLE 2

Determination of concentration of exogenous calcium signal stimulation solution-$CaCl_2$ solution:

(1) The protoplasts prepared in Example 1 were taken out, and mixed with the calcium dye according to a ratio of protoplast: calcium dye=1:1, and a group added with only a calcium dye and without protoplasts was taken as a control group, and added to a 96-well plate of a cell plate, as shown in Table 1:

TABLE 1

| | 1 | 2 | 3 | 4 | 5 | 6 | 7 | 8 | 9 | 10 | 11 | 12 |
|---|---|---|---|---|---|---|---|---|---|---|---|---|
| | Cell plate settings for protoplasts and calcium dye ||||||||||||
| A | | | | | 75 μL Protoplast + 75 μL calcium dye ||||| | | 150 μL Calcium dye |
| B | | | | | | | | | | | | |
| C | | | | | | | | | | | | |
| D | | | | | | | | | | | | |
| E | | | | | | | | | | | | |
| F | | | | | | | | | | | | |
| G | | | | | | | | | | | | |
| H | | | | | | | | | | | | |

(2) A buffer (helps buffer) was used to prepare a 96-well plate of the cell plate with different concentrations of $CaCl_2$ (3) The cell plate was wrapped with a plastic wrap, and incubated at 37° C. for 1 h. After the incubation, the two plates were balanced, centrifuged at 600 rpm at 4° C. for 1-2 min, and loaded on the machine.

Figure 2:
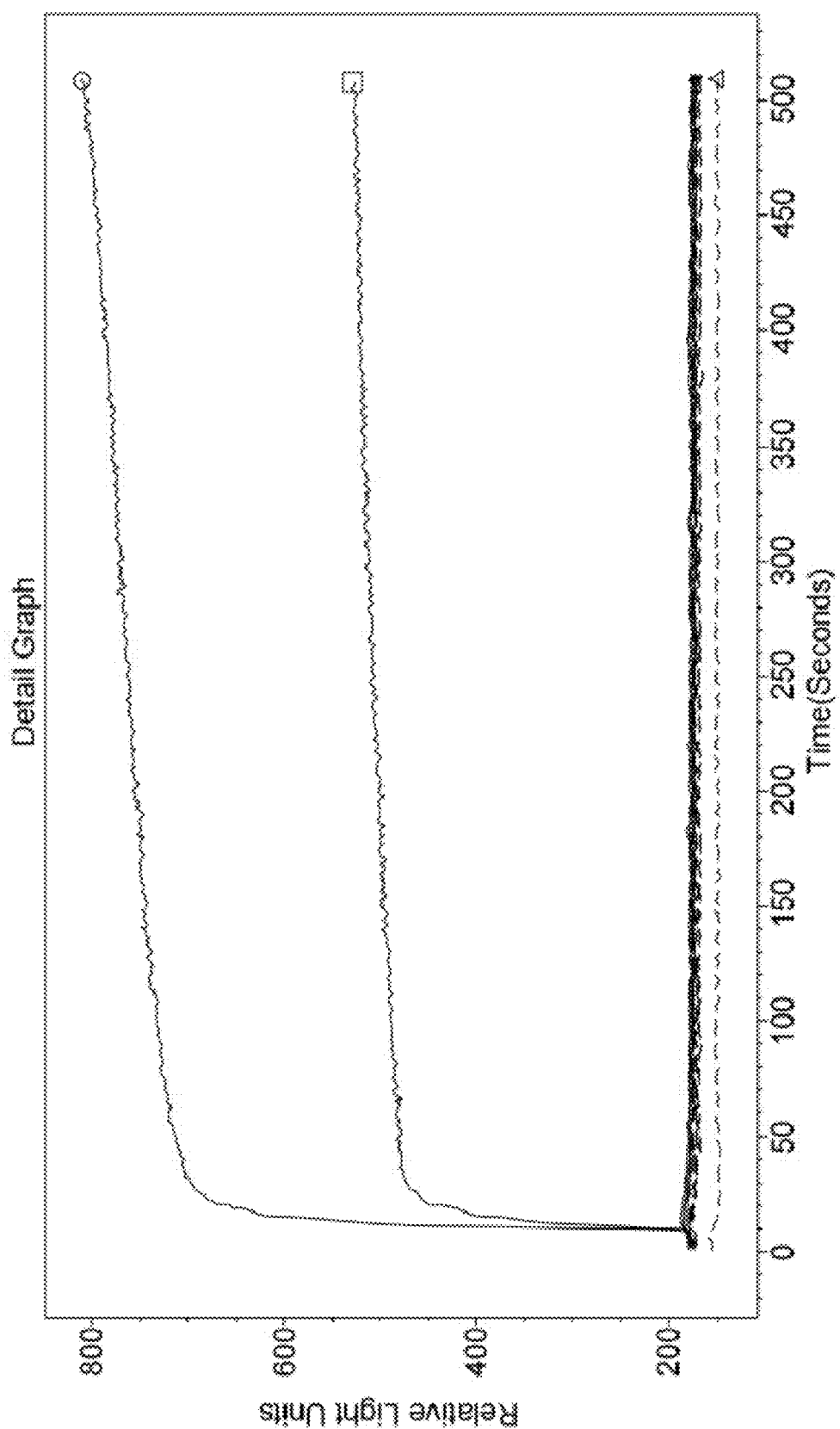
FIG. 2, FIG. 3, FIG. 4, and FIG. 5 show the effects of different concentrations of $CaCl_2$ solutions on calcium signals in protoplasts of the *Primula rupestris* leaves.
Figure 3:
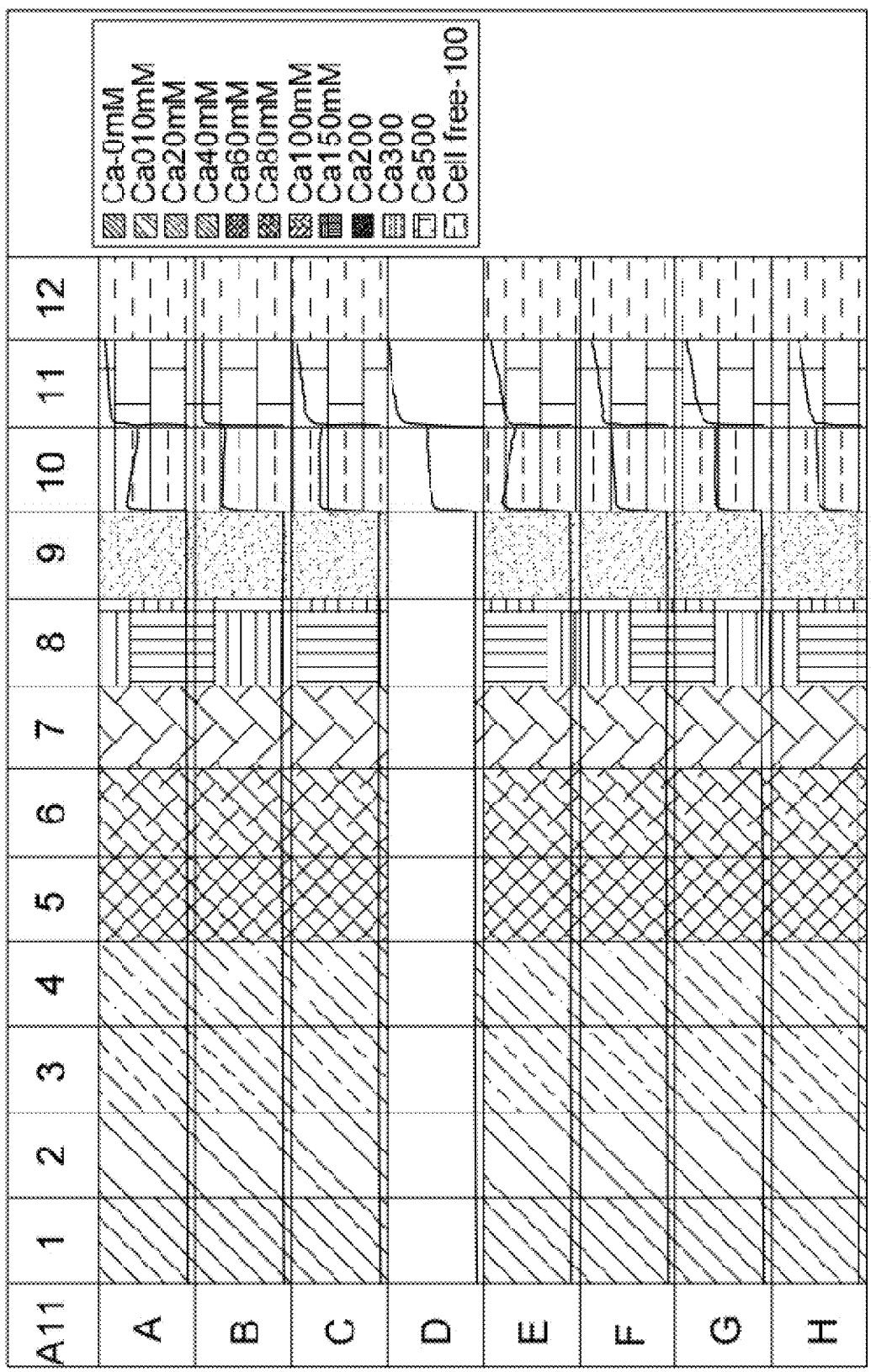

(4) The above experiment was repeated for 10 times to observe whether the results were consistent. The results are shown in FIG. 2 to FIG. 3. The order of concentrations from top to bottom in the legend on the right in FIG. 3 and the order of concentrations from left to right in Table 2 can be in one-to-one correspondence.

It can be seen from FIG. 2 to FIG. 3 that when the concentration of the $CaCl_2$ solution reaches 300 mM, the calcium signal surges significantly, indicating that the calcium signal can indeed cause the response of the protoplasts of the *Primula rupestris* leaves.

Figure 4:
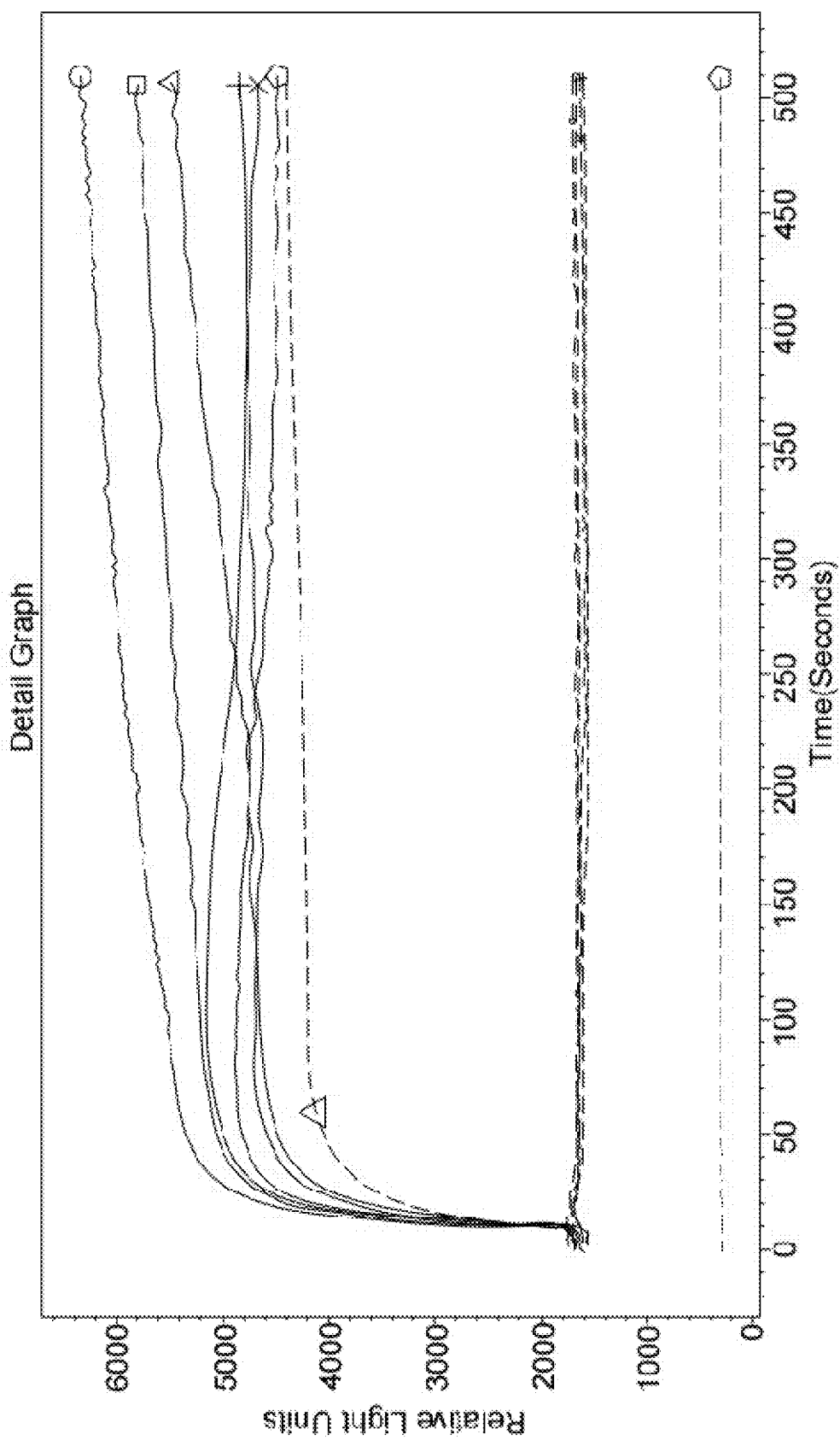
Figure 5:
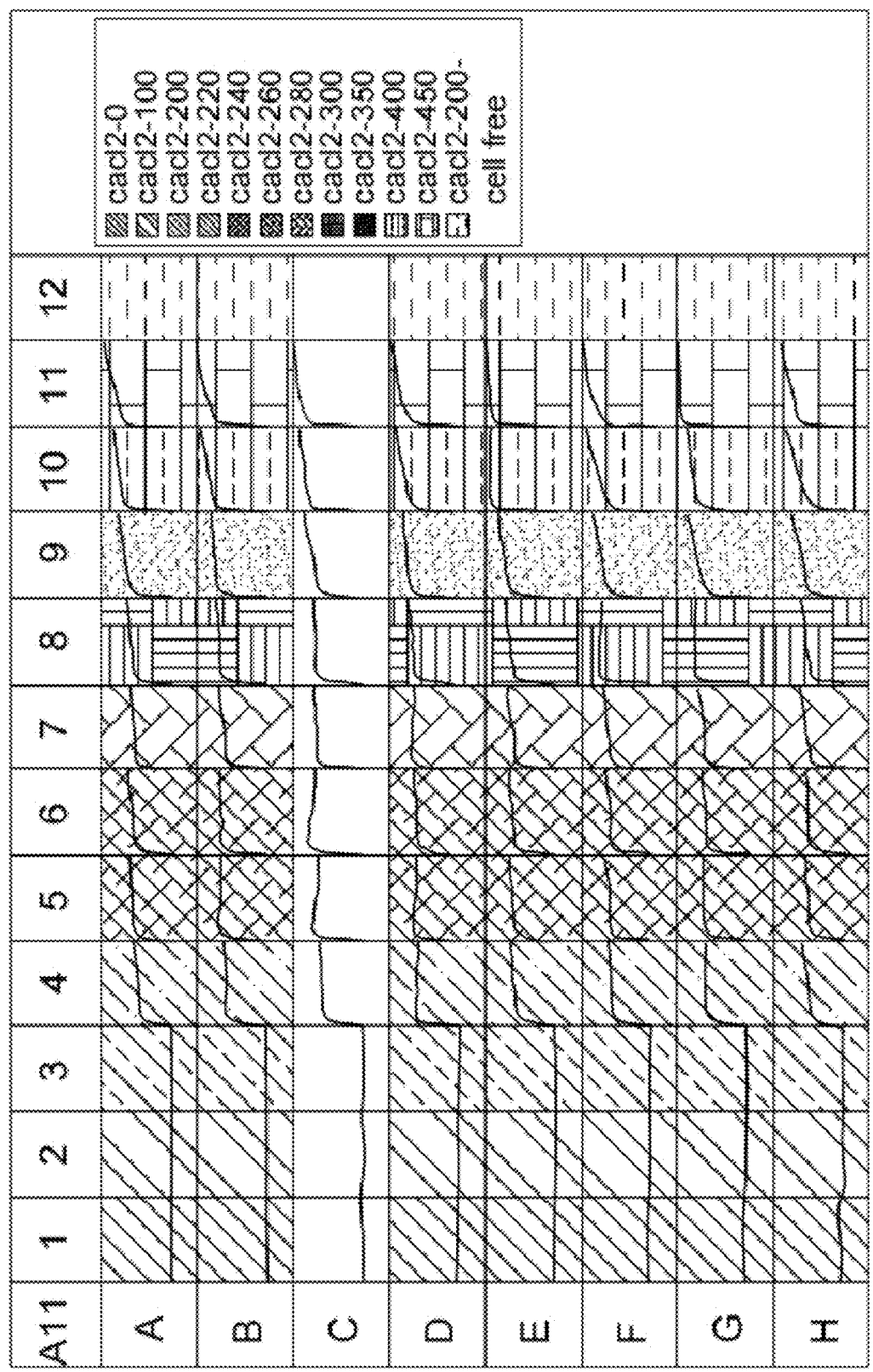

(5) Based on the above results, the concentration of the solution was further refined. The buffer was used to prepare a 96-well plate of the cell plate with different concentrations of $CaCl_2$ solutions: $CaCl_2$ (0, 100, 200, 220, 240, 260, 280, 300, 350, 400, and 450 mM). The specific settings are shown in Table 3. The cell plate was wrapped with a plastic wrap, and incubated at 37° C. for 1 h. After the incubation, the two plates were balanced, centrifuged at 600 rpm at 4° C. for 1-2 min, and loaded on the machine. The results are shown in FIG. 4 to FIG. 5. The order of concentrations from top to bottom in the legend on the right in FIG. 5 and the order of concentrations from left to right in Table 3 can be in one-to-one correspondence:

TABLE 3

| | | | | | Cell plate settings for CaCl$_2$ solution refinement | | | | | | |
|---|---|---|---|---|---|---|---|---|---|---|---|
| 1 | 2 | 3 | 4 | 5 | 6 | 7 | 8 | 9 | 10 | 11 | 12 |
| A 100 μL | 100 | 200 | 220 | 240 | 260 | 280 | 300 | 350 | 400 | 450 | Cell |
| B Buffer | mM | mM | mM | mM | mM | mM | mM | mM | mM | mM | Free |
| C | | | | | | | | | | | 100 |
| D | | | | | | | | | | | mM |
| E | | | | | | | | | | | |
| F | | | | | | | | | | | |
| G | | | | | | | | | | | |
| H | | | | | | | | | | | |

It can be seen from FIG. 4 to FIG. 5 that when the concentration of the CaCl$_2$ solution reaches 220 mM, the calcium signal surges significantly, indicating that the calcium signal can indeed cause the response of the protoplasts of the *Primula rupestris*, and confirming that the concentration of the CaCl$_2$ solution is 220-450 mM.

EXAMPLE 3

Determination of concentration of calcium signal chelator-CaCl$_2$ solution:

Using step (1) in Example 2, a buffer was used to prepare a 96-well plate of a cell plate with different concentrations of EGTA solutions: EGTA solution (0, 0.1, 0.5, 1.0, 5, 10, 25, 50, 100, 150, and 200 mM). The EGTA solution had a volume of 100 μL, and the specific settings are shown in Table 4:

TABLE 4

| | | | | Cell plate settings for different concentrations of EGTA solutions | | | | | | | |
|---|---|---|---|---|---|---|---|---|---|---|---|
| 1 | 2 | 3 | 4 | 5 | 6 | 7 | 8 | 9 | 10 | 11 | 12 |
| A 100 | 0.1 | 0.5 | 1 | 5 | 10 | 25 | 50 | 100 | 150 | 200 | Cell |
| B μL | μM | μM | μM | μM | μM | μM | μM | μM | μM | μM | Free |
| C Buf- | | | | | | | | | | | 10 |
| D fer | | | | | | | | | | | μM |
| E | | | | | | | | | | | |
| F | | | | | | | | | | | |
| G | | | | | | | | | | | |
| H | | | | | | | | | | | |

The cell plate was wrapped with a plastic wrap, and incubated at 37° C. for 1 h. After the incubation, the two plates were balanced, centrifuged at 600 rpm at 4° C. for 1-2 min, and loaded on the machine.

Figure 6:
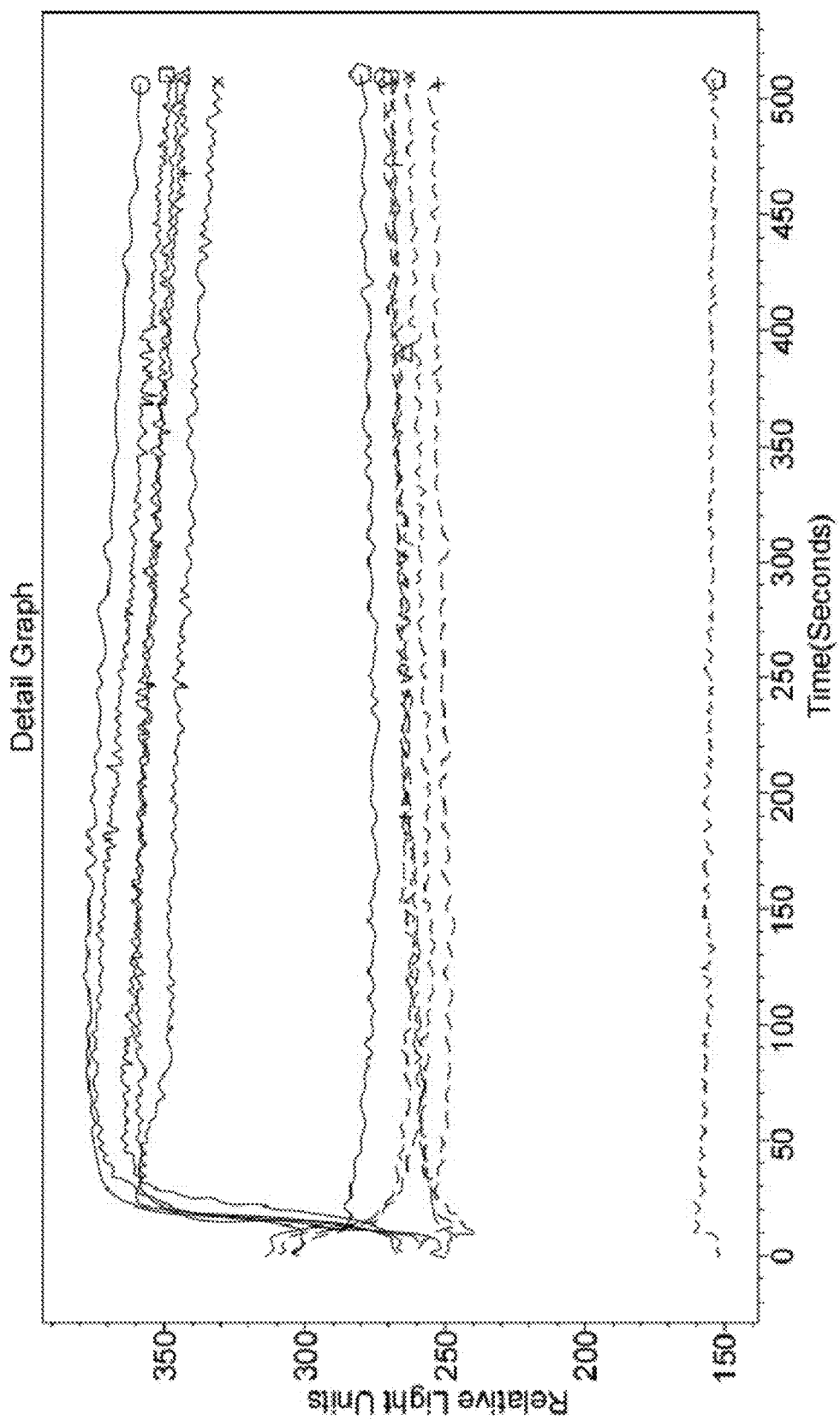
FIG. 6 and FIG. 7 show the chelation effects of different concentrations of ETGA solutions on the calcium signals in the protoplasts of the *Primula rupestris* leaves.
Figure 7:
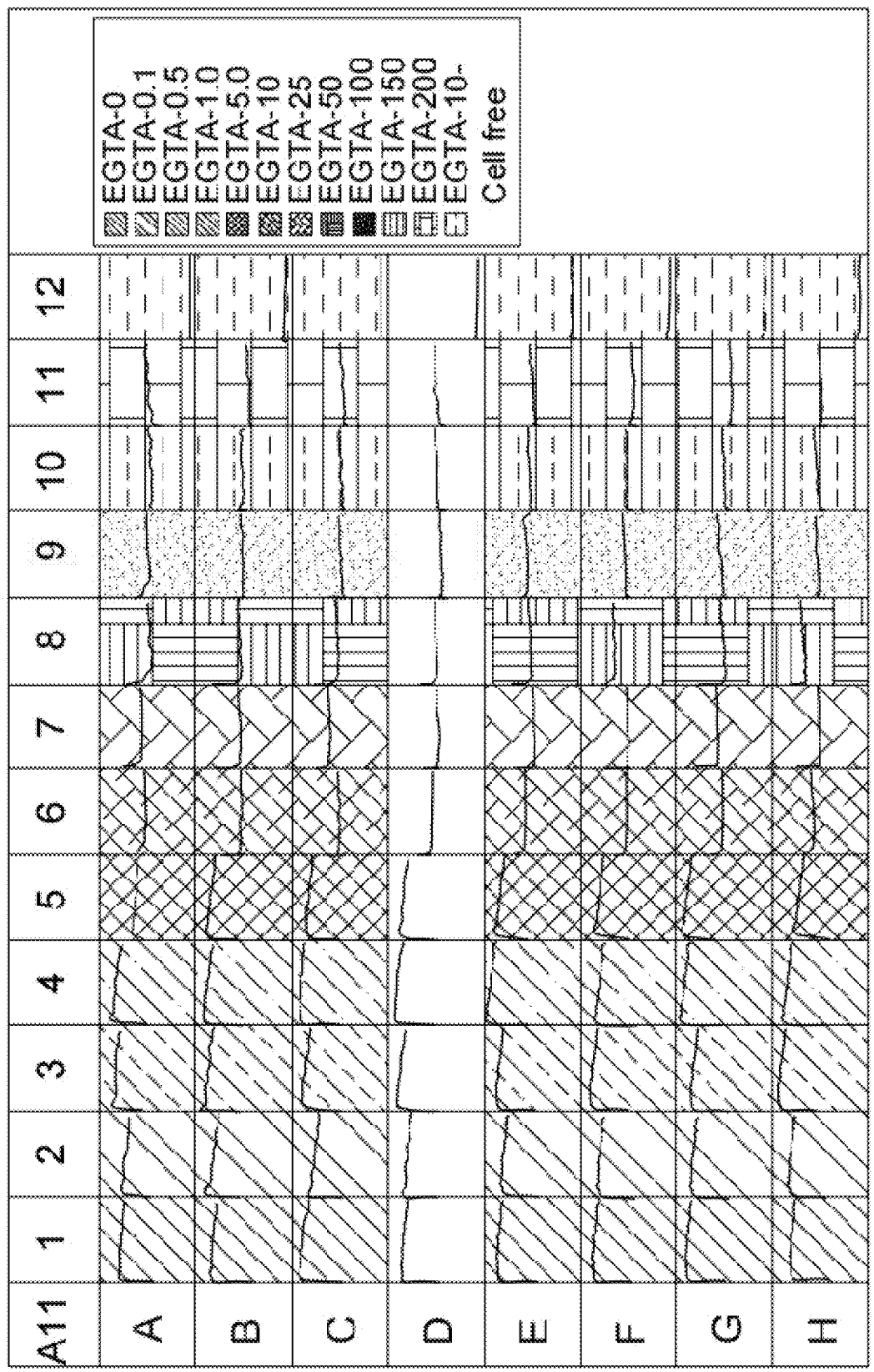

The above experiment was repeated for 10 times to observe whether the results were consistent. The results are shown in FIG. 6 to FIG. 7. The order of concentrations from top to bottom in the legend on the right in FIG. 7 and the order of concentrations from left to right in Table 4 can be in one-to-one correspondence.

It can be seen from FIG. 6 to FIG. 7 that the EGTA solution can indeed chelate the calcium signal inside the plant protoplasts in a short period of time, causing changes in the calcium signal, and the effect of 5-200 μM is relatively excellent.

EXAMPLE 4

(1) The protoplasts prepared in Example 1 were taken out, and mixed with the calcium dye according to a ratio of protoplast: calcium dye=1:1 till a total of 150 μL, and a group added with only a calcium dye and without protoplasts was taken as a control group, and added to a 96-well plate of a cell plate.

(2) 220 mM of CaCl$_2$ solution and 100 μM of EGTA solution were added to the 96-well plate of the cell plate in step (1). The EGTA solution and the CaCl$_2$ solution had a total volume of 100 μL, and a volume ratio of 1:1.

(3) The cell plate was wrapped with a plastic wrap, and incubated at 37° C. for 1 h. After the incubation, the two plates were balanced, centrifuged at 600 rpm at 4° C. for 1-2 min, and loaded on the machine.

(4) The above experiment was repeated for 10 times to observe whether the results were consistent.

EXAMPLES 5 to 11 AND COMPARATIVE EXAMPLES 1 to 4

Examples 5 to 11 and Comparative Examples 1 to 4 were implemented according to the method steps in Example 1. The difference was that the EGTA solution and the CaCl$_2$ solution in step (3) had different concentrations, and the corresponding parameters are shown in Table 5:

TABLE 5

| Parameter settings in Examples 1 to 8 and Comparative Examples 1 to 4 | | | |
|---|---|---|---|
| | EGTA solution (μM) | CaCl$_2$ solution (μM) | SN |
| Example 4 | 1.0 | 220 | 4 |
| Example 5 | 5.0 | 240 | 5 |
| Example 6 | 10 | 260 | 6 |
| Example 7 | 25 | 280 | 7 |
| Example 8 | 50 | 300 | 8 |
| Example 9 | 100 | 350 | 9 |

TABLE 5-continued

Parameter settings in Examples 1 to
8 and Comparative Examples 1 to 4

| | EGTA solution (μM) | CaCl$_2$ solution (μM) | SN |
|---|---|---|---|
| Example 10 | 150 | 400 | 10 |
| Example 11 | 200 | 450 | 11 |
| Comparative Example 1 | 0 | 0 | 1 |
| Comparative Example 2 | 0.1 | 100 | 2 |
| Comparative Example 3 | 0.5 | 200 | 3 |
| Comparative Example 4 | No protoplast blank control, the CaCl$_2$ solution has a concentration of 200 | | 12 |

Figure 8:
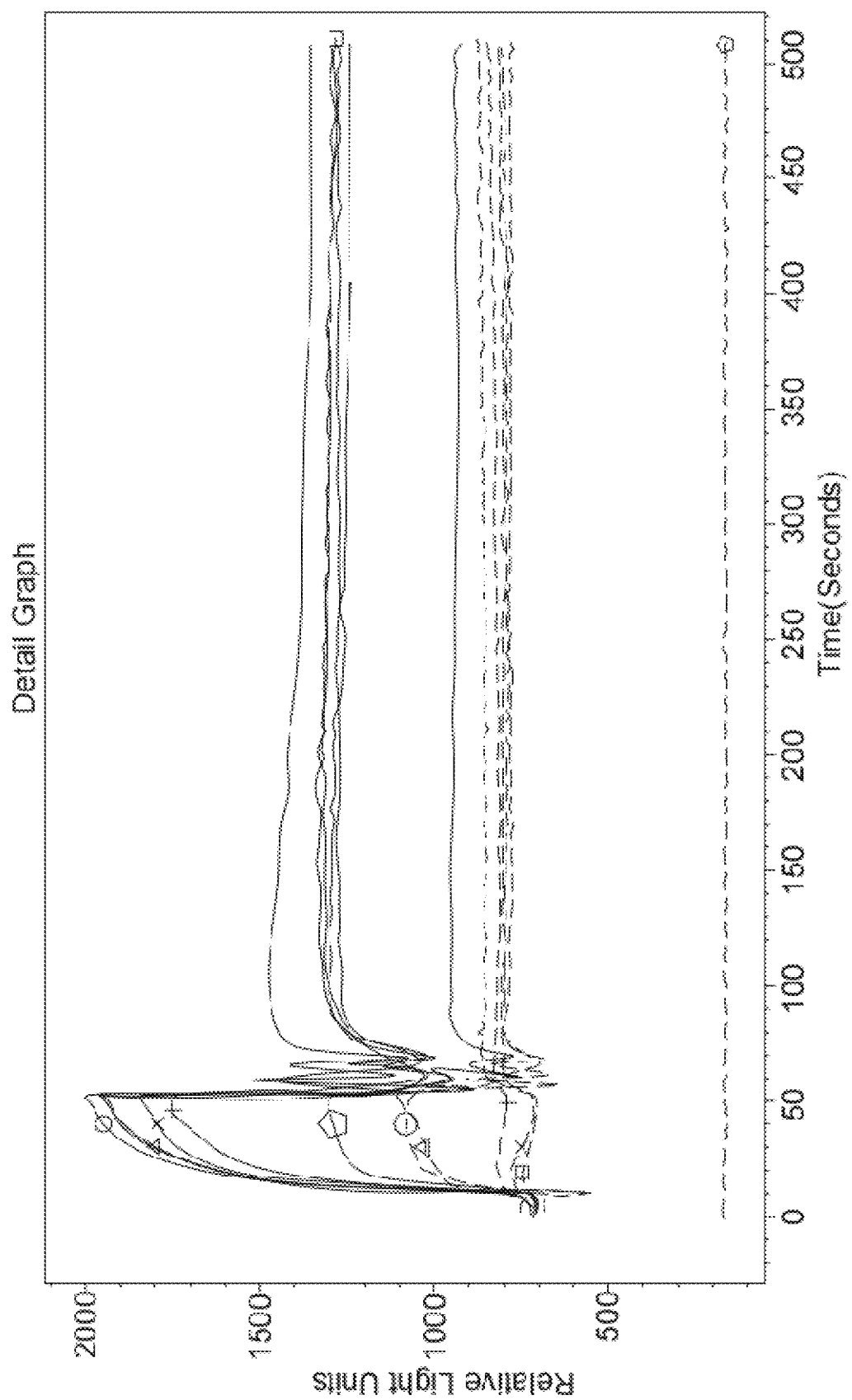
FIG. 8 and FIG. 9 show the effects of a composite reaction of the EGTA solution and the $CaCl_2$ solution on the calcium signals in the protoplasts of the *Primula rupestris* leaves.
Figure 9:
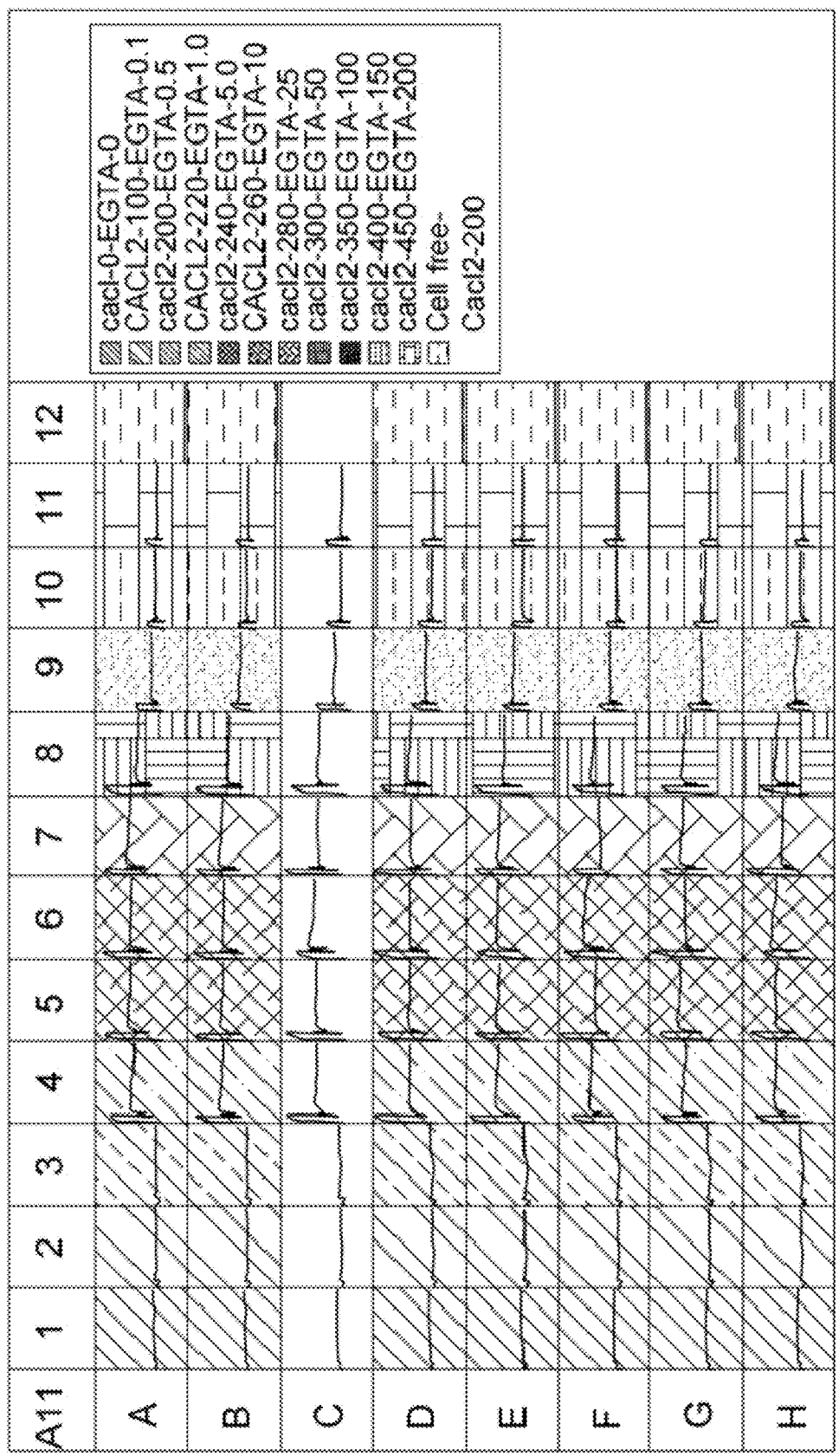

The results of Examples 4 to 11 and Comparative Examples 1 to 4 are shown in FIG. 8 to FIG. 9. Since the legend is not fully marked when FIG. 9 is exported, the detailed concentrations of the EGTA solution and the CaCl$_2$ solution correspond to Table 5. The order of concentrations from top to bottom in the legend on the right in FIG. 9 corresponds to the sequence numbers from left to right at the top of FIG. 9, which in turn corresponds to the same sequence numbers in Table 5. For example, the upper sequence number 1 in FIG. 9 corresponds to the sequence number 1 in Table 5.

It can be seen from FIG. 8 to FIG. 9 that the exogenous calcium signal can trigger the change of the fluorescence of the FLIPR calcium signal, and the EGTA can chelate the change of the fluorescence caused by the exogenous calcium signal. Based on the above changes, it can be concluded that the calcium signals in the plants can be detected by the FLIPR by using the method provided by the present disclosure.

EXAMPLES 12 to 18 AND COMPARATIVE EXAMPLES 5 to 9

Figure 10:
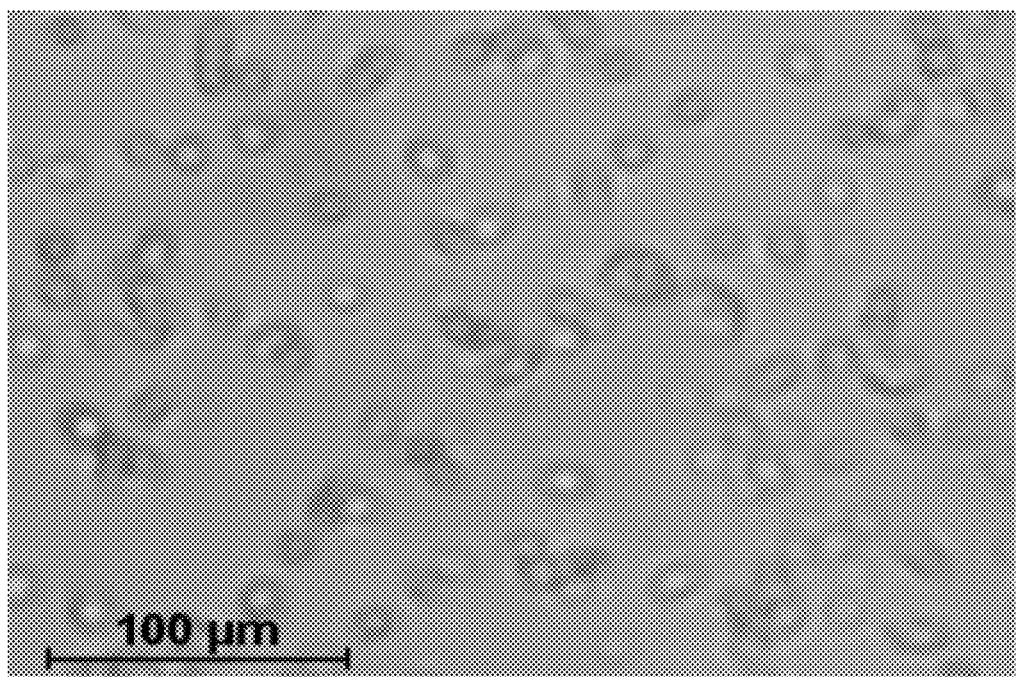
FIG. 10 is a protoplast map of *Primula rupestris* sepals.

The protoplasts of *Primula rupestris* sepals were extracted using the same method as Example 1, and the protoplast results are shown in FIG. 10.

It can be seen from FIG. 10 that the protoplasts obtained by the method for extracting the plant protoplasts provided by the present disclosure are approximately circular, with a large number and few fragments.

Figure 11:
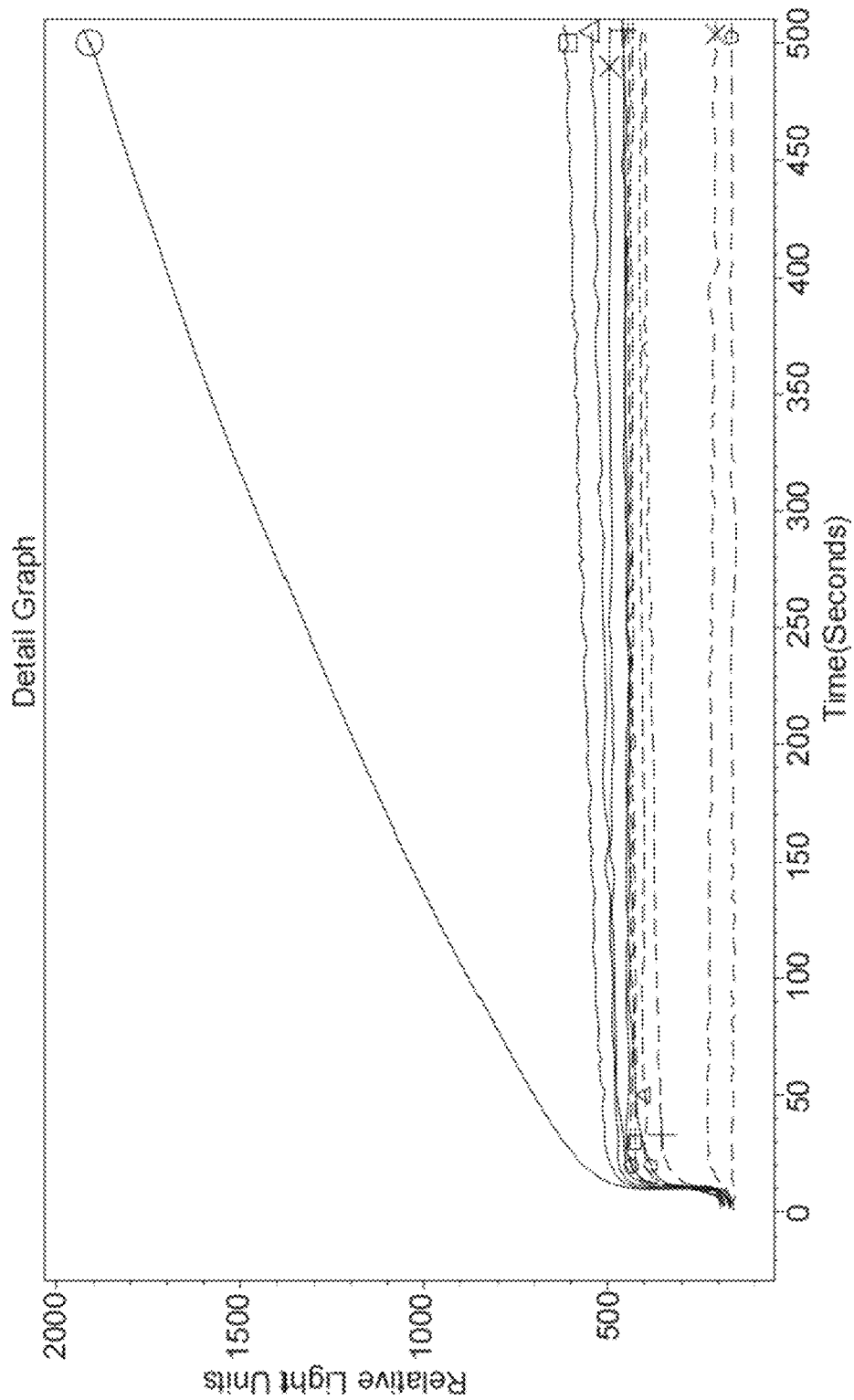
FIG. 11 and FIG. 12 show the effects of different concentrations of $CaCl_2$ solutions on calcium signals in protoplasts of the *Primula rupestris* sepals.
Figure 12:
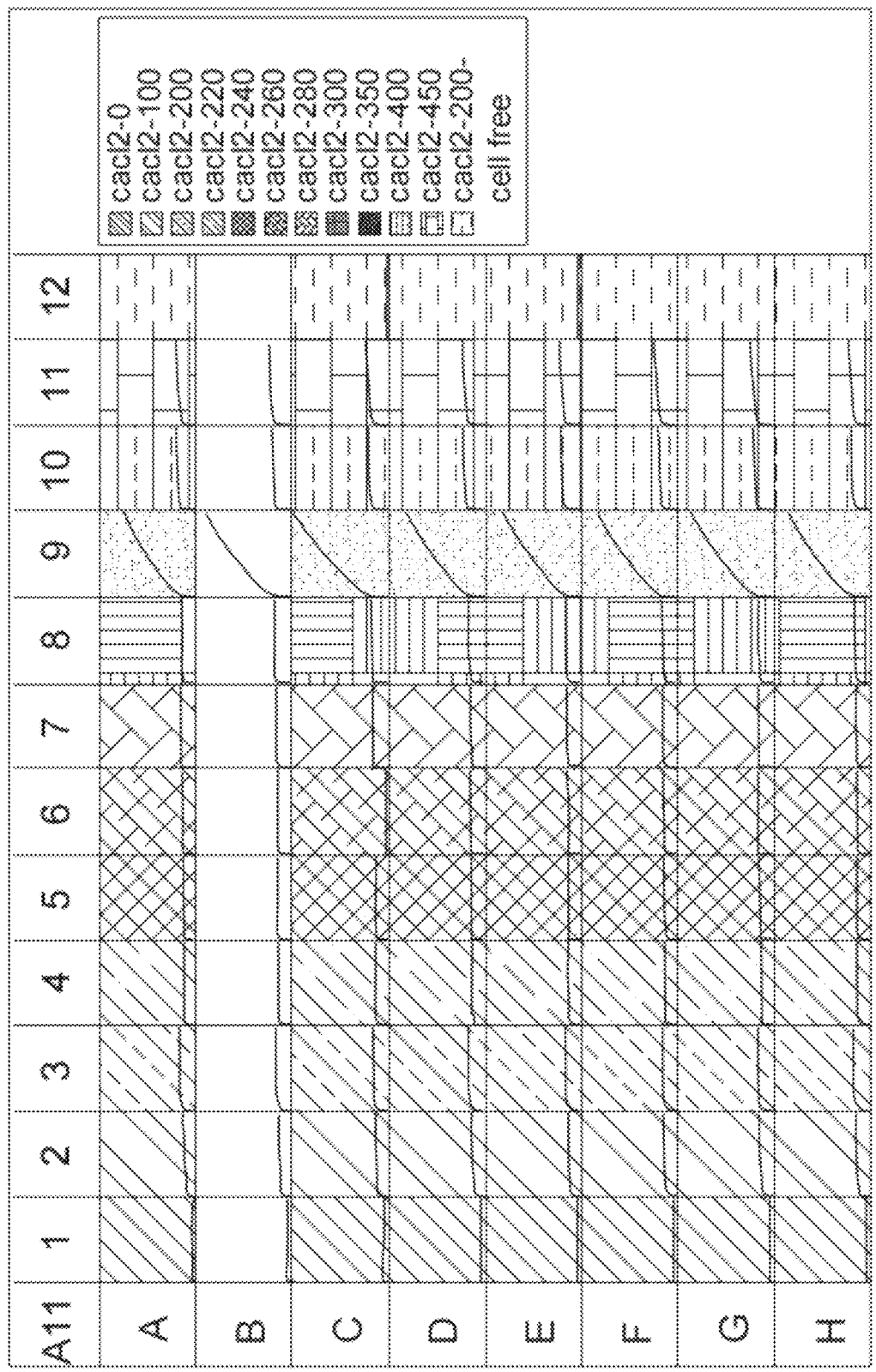

Using the method in Example 2, it is confirmed that the exogenous calcium signal stimulation solution-CaCl$_2$ solution of the protoplasts of the *Primula rupestris* sepals has a concentration of 350 mM (see FIG. 11 to FIG. 12). It can be seen from FIG. 11 to FIG. 12 that when the CaCl$_2$ has a concentration of 350 mM (corresponding to the 9th column in FIG. 12), the calcium signal changes significantly in the protoplasts of the *Primula rupestris* sepals.

Figure 13:
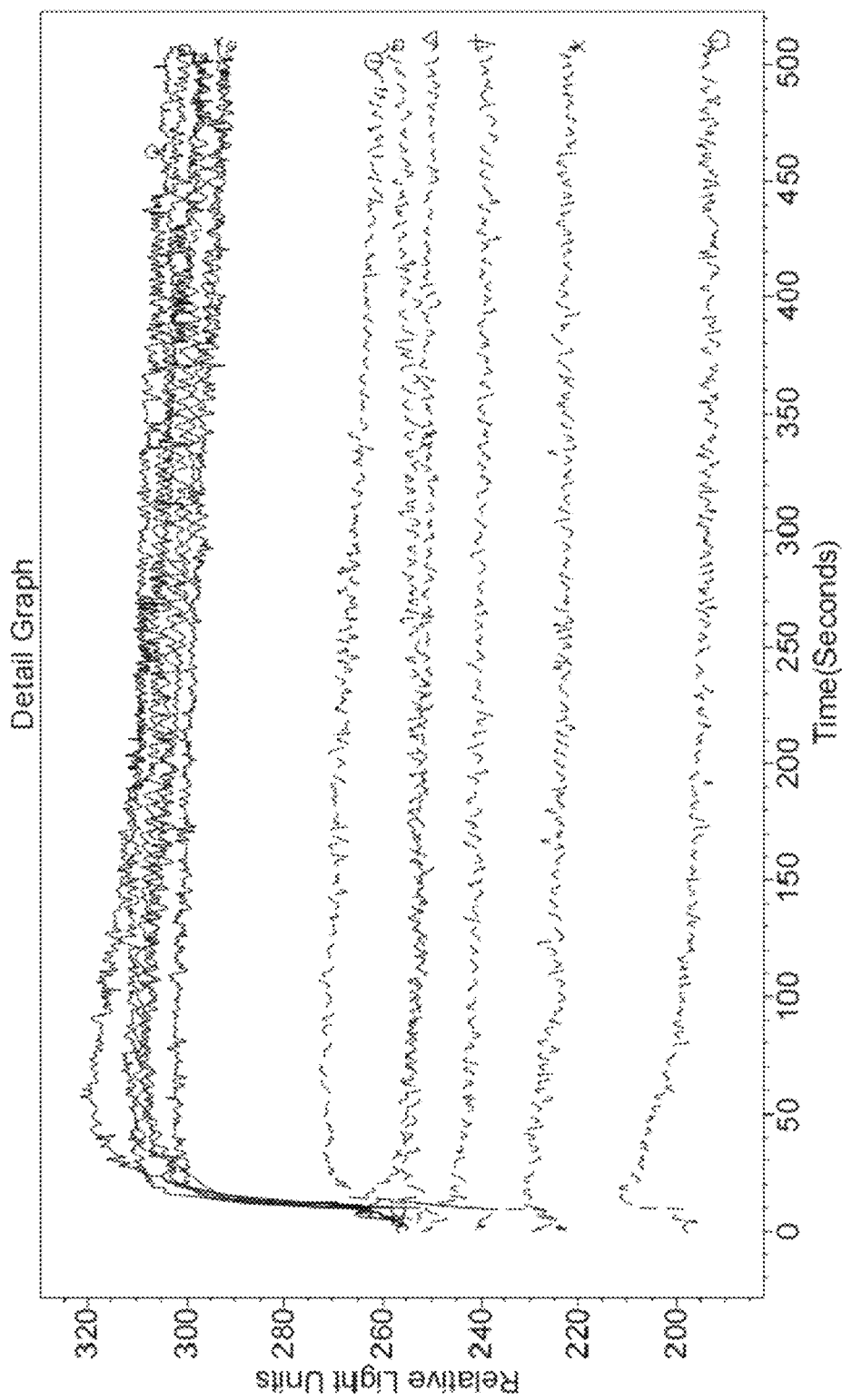
FIG. 13 and FIG. 14 show the chelation effects of different concentrations of ETGA solutions on the calcium signals in the protoplasts of the *Primula rupestris* sepals.
Figure 14:
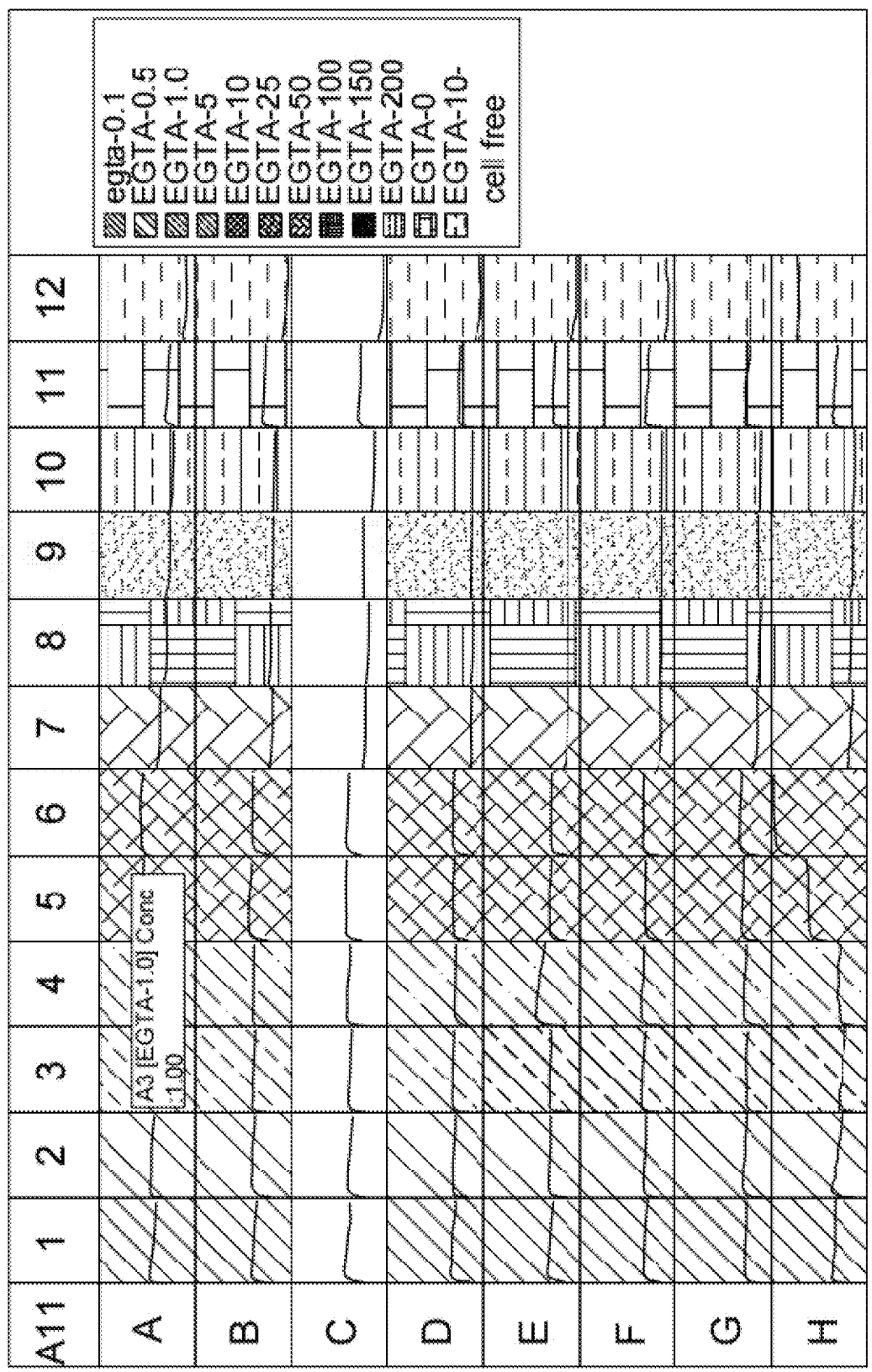

Using the method in Example 3, it is confirmed that the calcium signal chelator-EGTA solution of the protoplasts of the *Primula rupestris* sepals has a concentration of 5-200 μM (see FIG. 13 to FIG. 14) (corresponding to the 4th to 10th columns in FIG. 14).

According to the method in Example 4, the EGTA solution and the CaCl$_2$ solution were combined to treat the change of the protoplasts of the *Primula rupestris* sepals, and the parameters of the examples and comparative examples are shown in Table 6:

TABLE 6

Parameter settings in Examples 12 to
18 and Comparative Examples 5 to 9

| | EGTA solution (μM) | CaCl$_2$ solution (μM) | SN |
|---|---|---|---|
| Example 12 | 5 | 240 | 5 |
| Example 13 | 10 | 260 | 6 |
| Example 14 | 25 | 280 | 7 |
| Example 15 | 50 | 300 | 8 |
| Example 16 | 100 | 350 | 9 |
| Example 17 | 150 | 400 | 10 |
| Example 18 | 200 | 450 | 11 |
| Comparative Example 5 | 0 | 0 | 1 |
| Comparative Example 6 | 0.1 | 100 | 2 |
| Comparative Example 7 | 0.5 | 200 | 3 |
| Comparative Example 8 | 1.0 | 220 | 4 |
| Comparative Example 9 | 10 | 200 | 12 |

Figure 15:
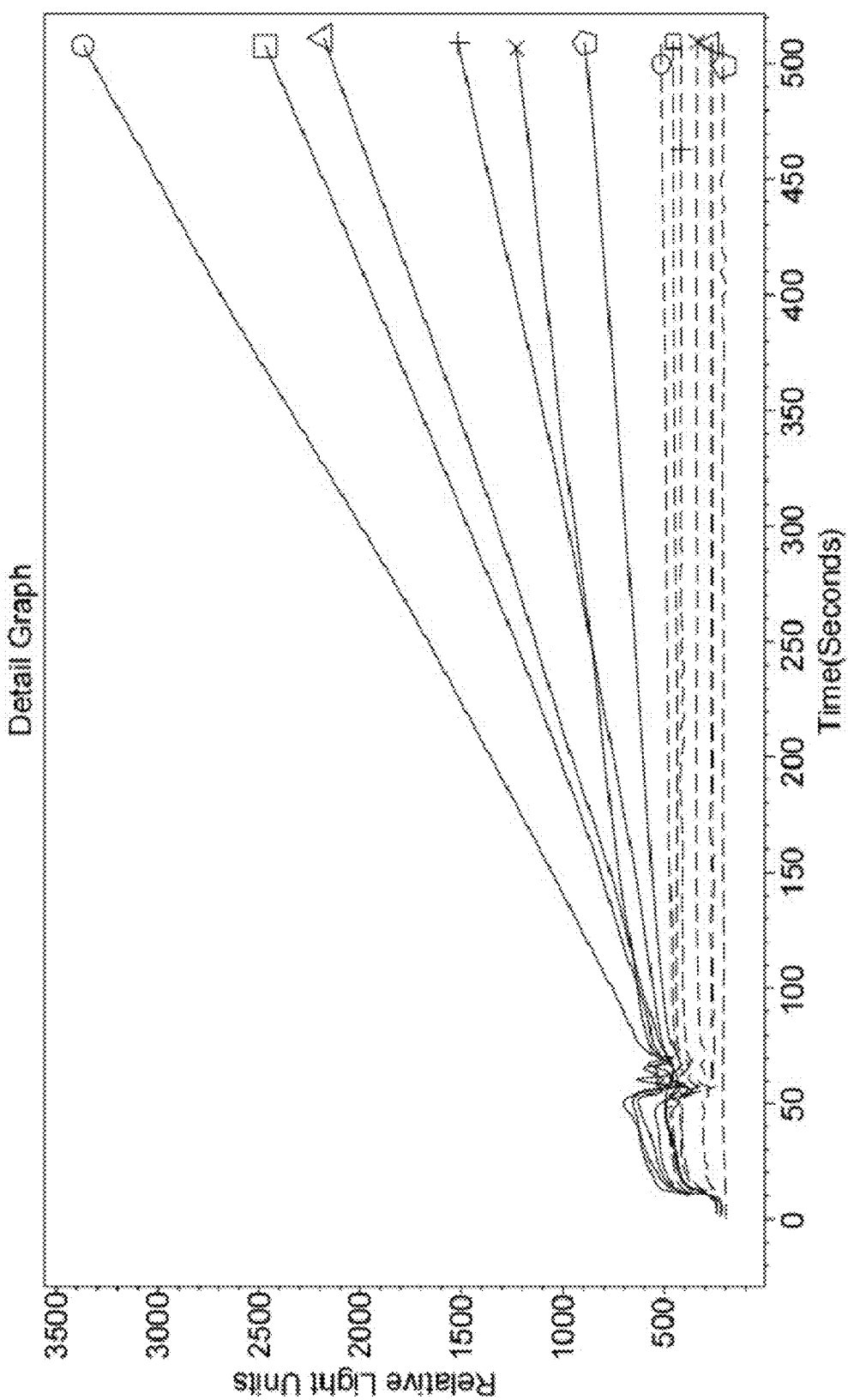
FIG. 15 and FIG. 16 show the effects of a composite reaction of the EGTA solution and the $CaCl_2$ solution on the calcium signals in the protoplasts of the *Primula rupestris* sepals.
Figure 16:
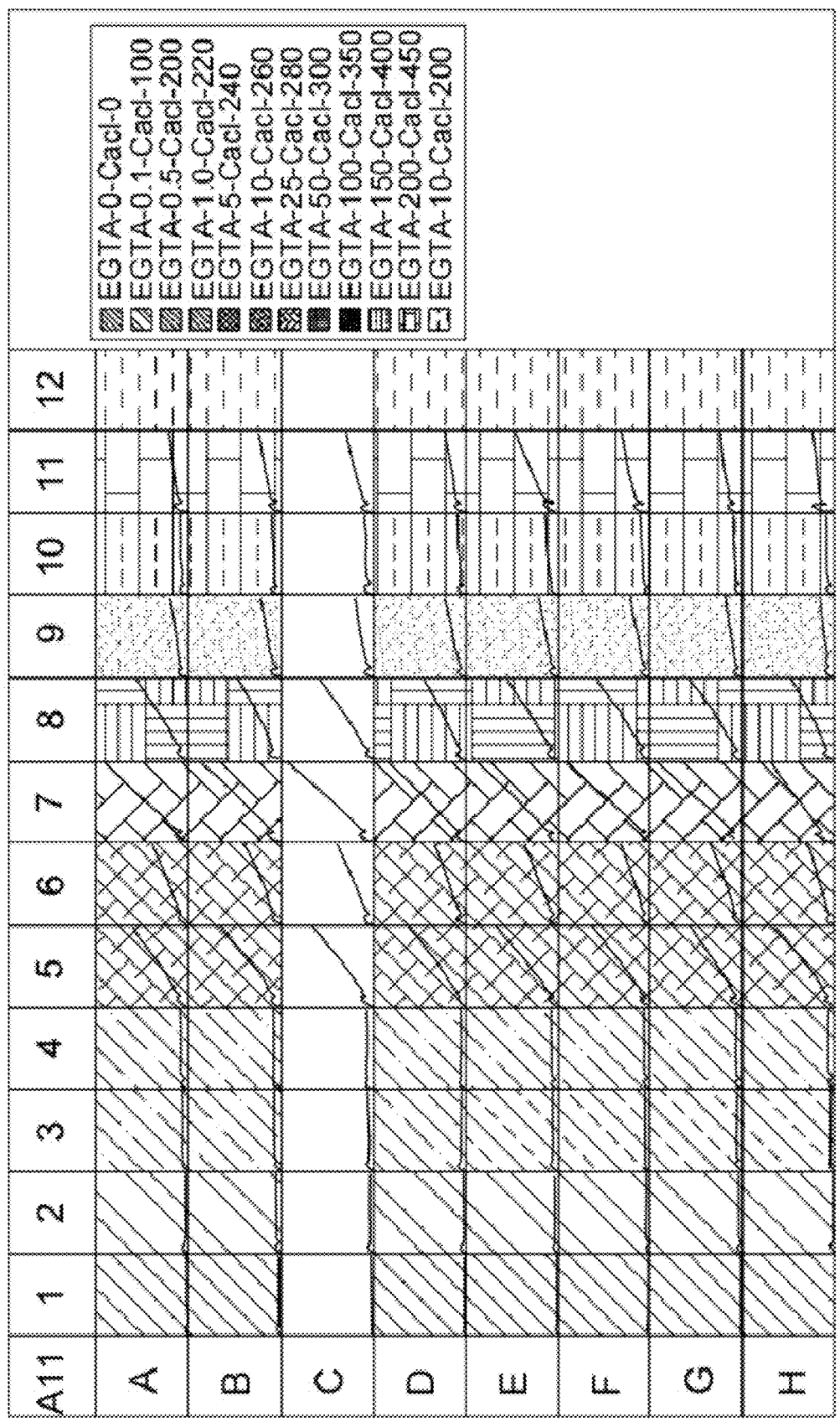

The results of Examples 12 to 18 and Comparative Examples 5 to 9 are shown in FIG. 15 to FIG. 16. Since the legend is not fully marked when FIG. 16 is exported, the detailed concentrations of the EGTA solution and the CaCl$_2$ solution correspond to Table 6. The order of concentrations from top to bottom in the legend on the right in FIG. 16 corresponds to the sequence numbers from left to right at the top of FIG. 16, which in turn corresponds to the same sequence numbers in Table 6. For example, the upper sequence number 1 in FIG. 16 corresponds to the sequence number 1 in Table 6.

It can be seen from FIG. 15 to FIG. 16 that the exogenous calcium signal can trigger the change of the fluorescence of the FLIPR calcium signal, and the EGTA can chelate the change of the fluorescence caused by the exogenous calcium signal.

EXAMPLES 19 to 25 AND COMPARATIVE EXAMPLES 10 to 14

Figure 17:
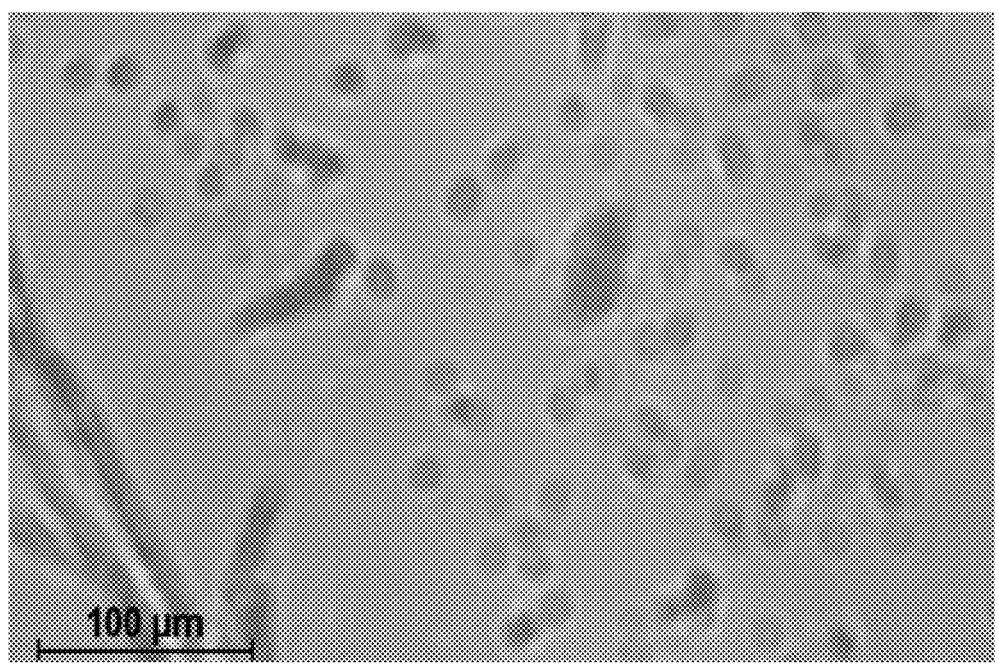
FIG. 17 is a protoplast map of *Primula rupestris* petals.

The protoplasts of *Primula rupestris* petals were extracted using the same method as Example 1, and the protoplast results are shown in FIG. 17.

It can be seen from FIG. 17 that the protoplasts obtained by the method for extracting the plant protoplasts provided by the present disclosure are approximately circular, with a large number and few fragments.

Figure 18:
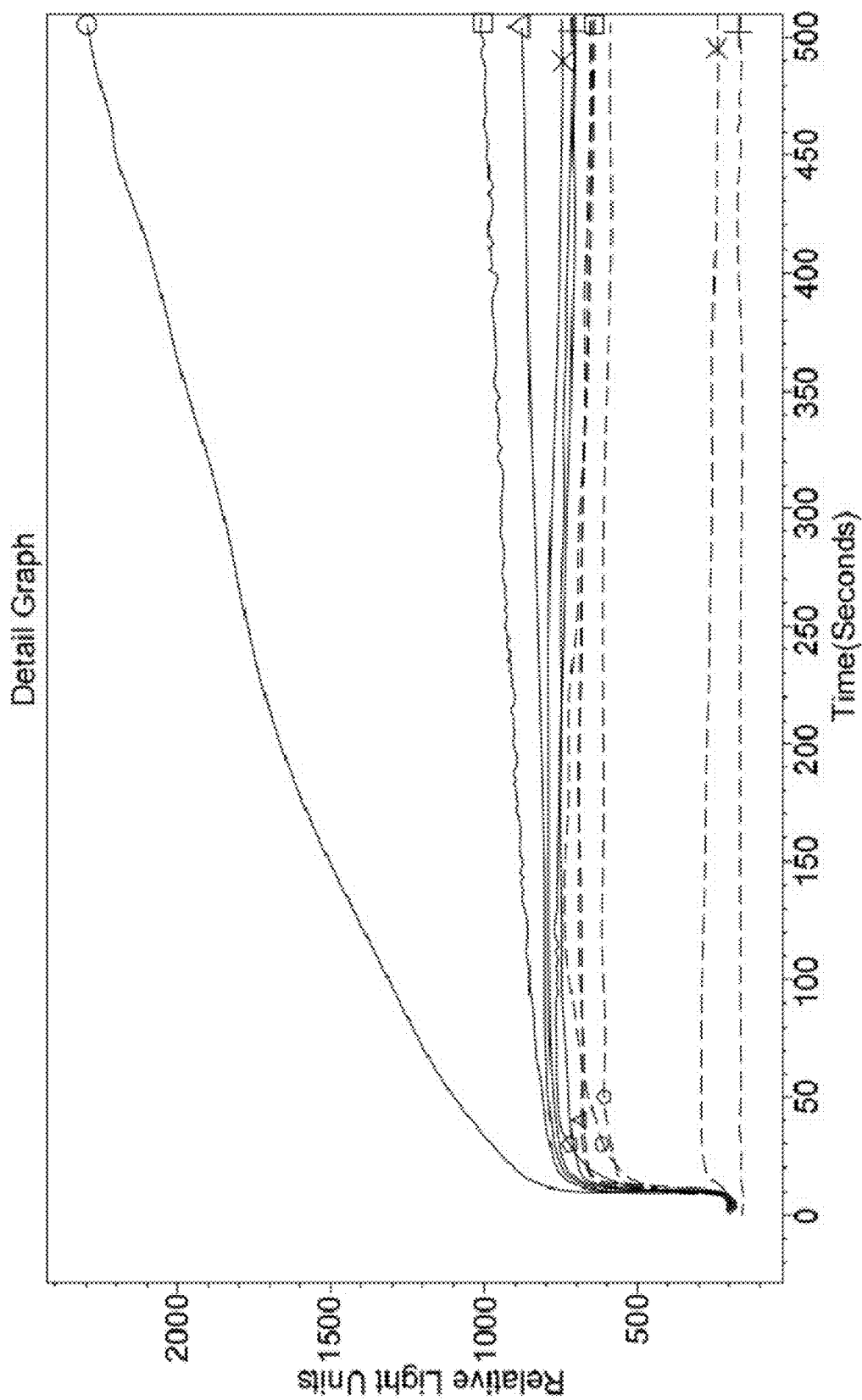
FIG. 18 to FIG. 19 show the effects of different concentrations of $CaCl_2$ solutions on calcium signals in and of the *Primula rupestris* petals.
Figure 19:
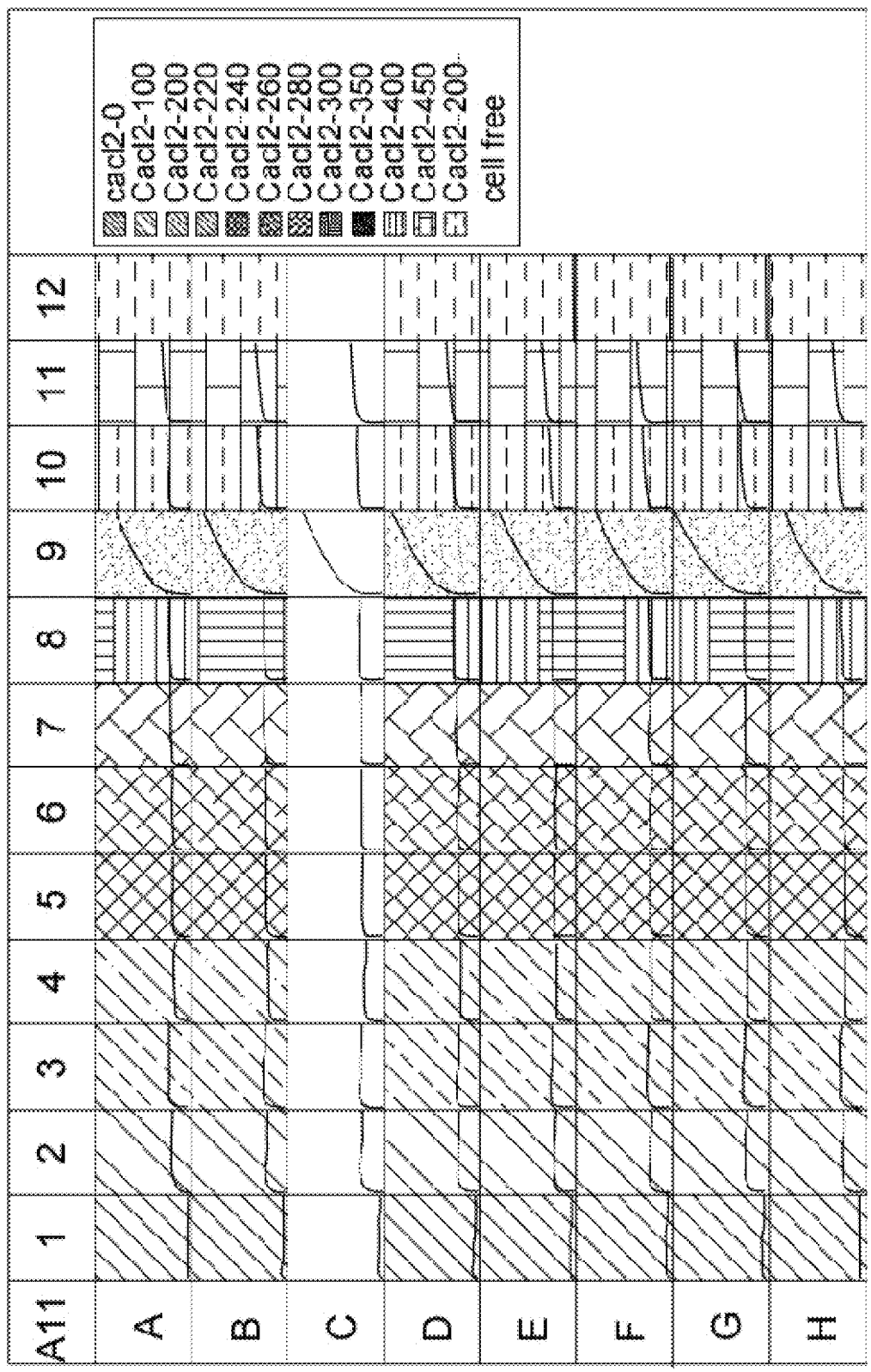

Using the method in Example 2, it is confirmed that when the exogenous calcium signal stimulation solution-CaCl$_2$ solution of the protoplasts of the *Primula rupestris* petals has a concentration of 350 mM, the calcium signal surges significantly (see FIG. 18 to FIG. 19). It can be seen from FIG. 18 to FIG. 19 that when the CaCl$_2$ has a concentration of 350-450 mM (corresponding to the 9th to 11th columns in FIG. 19), the calcium signal changes significantly in the protoplasts of the *Primula rupestris* petals.

Figure 20:
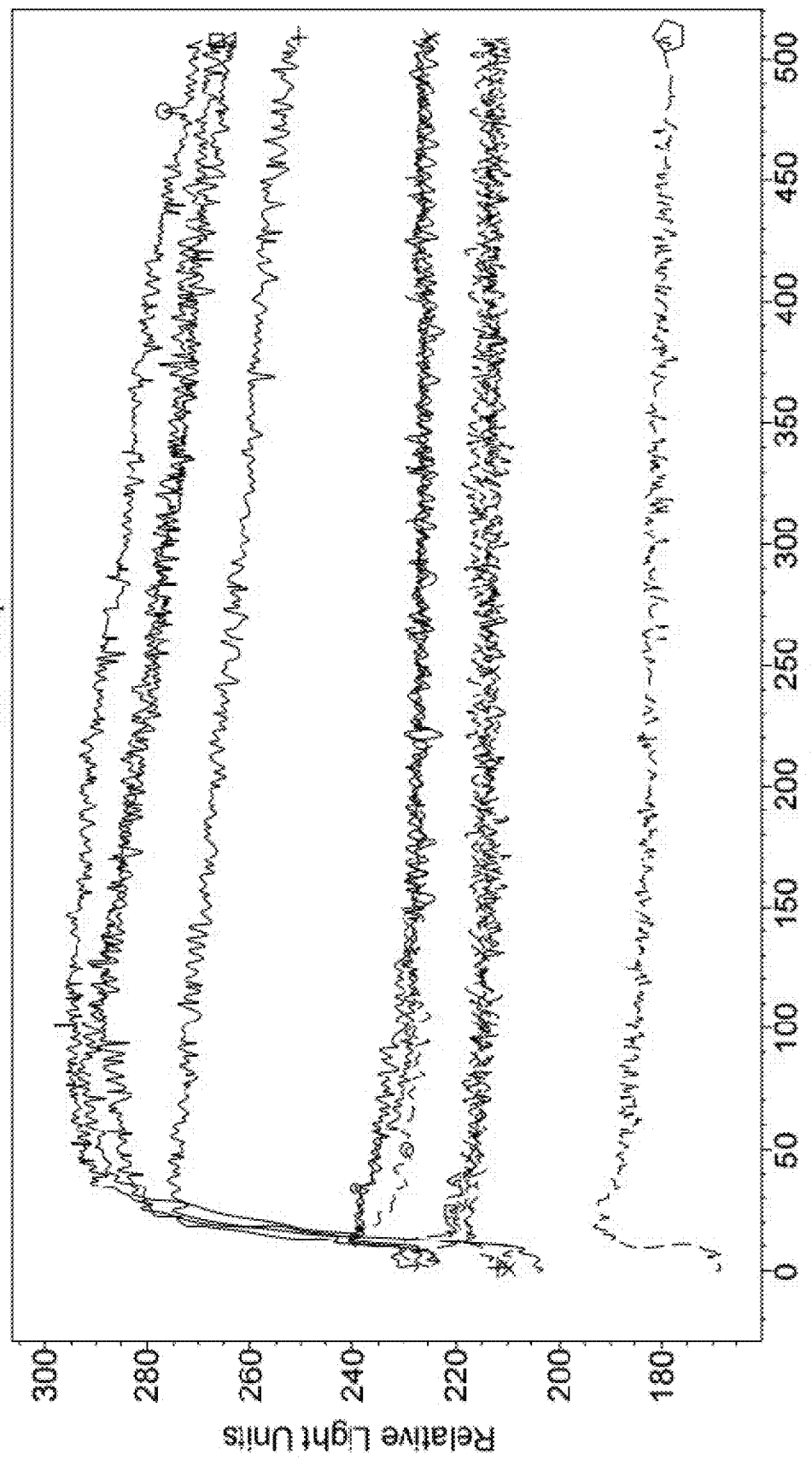
FIG. 20 and FIG. 21 show the chelation effects of different concentrations of ETGA solutions on the calcium signals in the protoplasts of the *Primula rupestris* petals.
Figure 21:
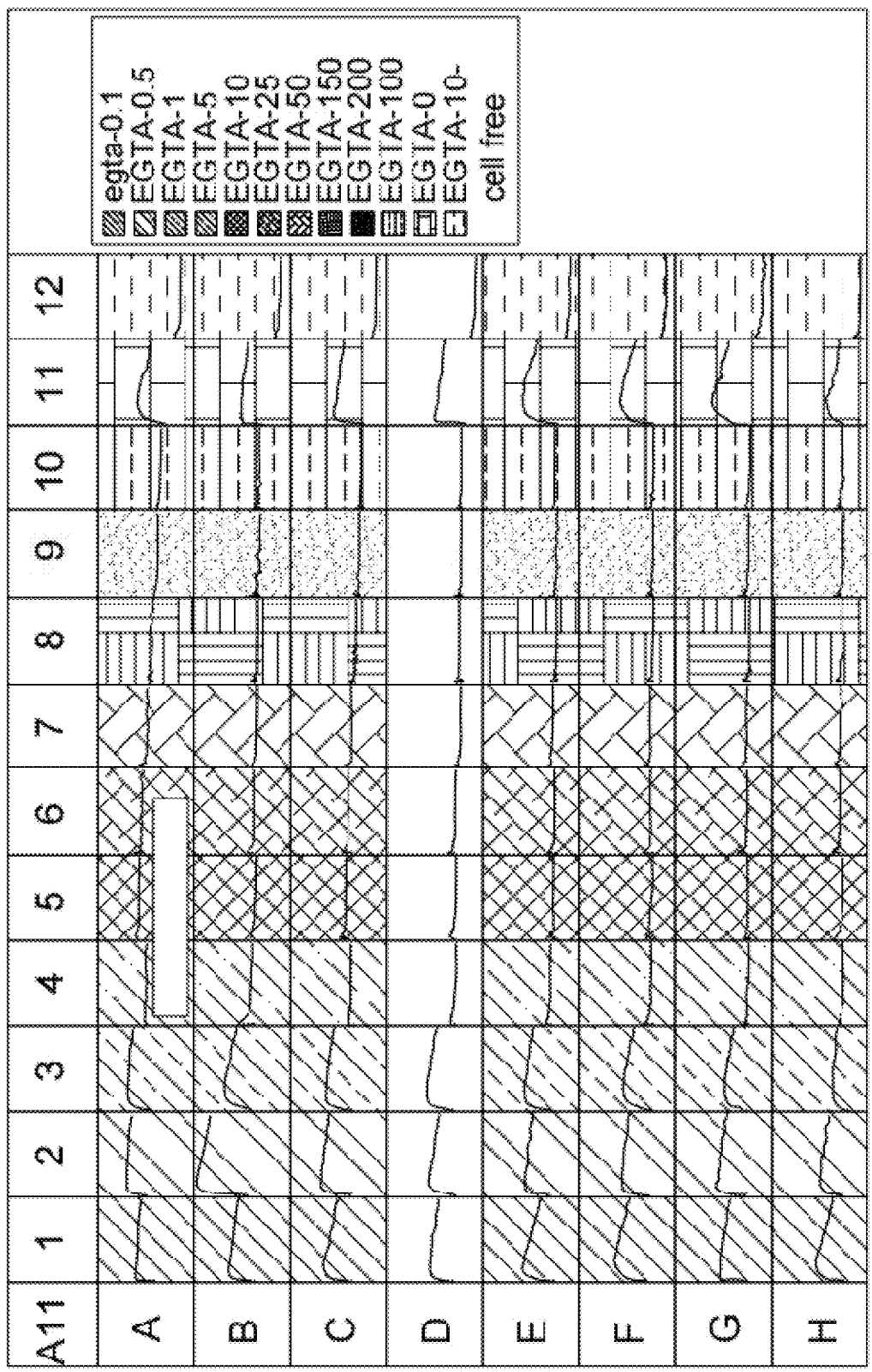

Using the method in Example 3, it is confirmed that the calcium signal chelator-EGTA solution of the protoplasts of the *Primula rupestris* petals has a concentration of 5-200 μM (corresponding to the 4th to 10th columns in FIG. 21), as shown in FIG. 20 to FIG. 21.

According to the method in Example 4, the EGTA solution and the CaCl$_2$ solution were combined to treat the change of the protoplasts of the *Primula rupestris* petals, and the parameters of the examples and comparative examples are shown in Table 7:

TABLE 7

Parameter settings in Examples 19 to 25 and Comparative Examples 10 to 14

|  | EGTA solution (μM) | CaCl$_2$ solution (μM) | SN |
|---|---|---|---|
| Example 19 | 5 | 240 | 5 |
| Example 20 | 10 | 260 | 6 |
| Example 21 | 25 | 280 | 7 |
| Example 22 | 50 | 300 | 8 |
| Example 23 | 100 | 350 | 9 |
| Example 24 | 150 | 400 | 10 |
| Example 25 | 200 | 450 | 11 |
| Comparative Example 10 | 0 | 0 | 1 |
| Comparative Example 11 | 0.1 | 100 | 2 |
| Comparative Example 12 | 0.5 | 200 | 3 |
| Comparative Example 13 | 1.0 | 220 | 4 |
| Comparative Example 14 | 10 | 200 | 12 |

Figure 22:
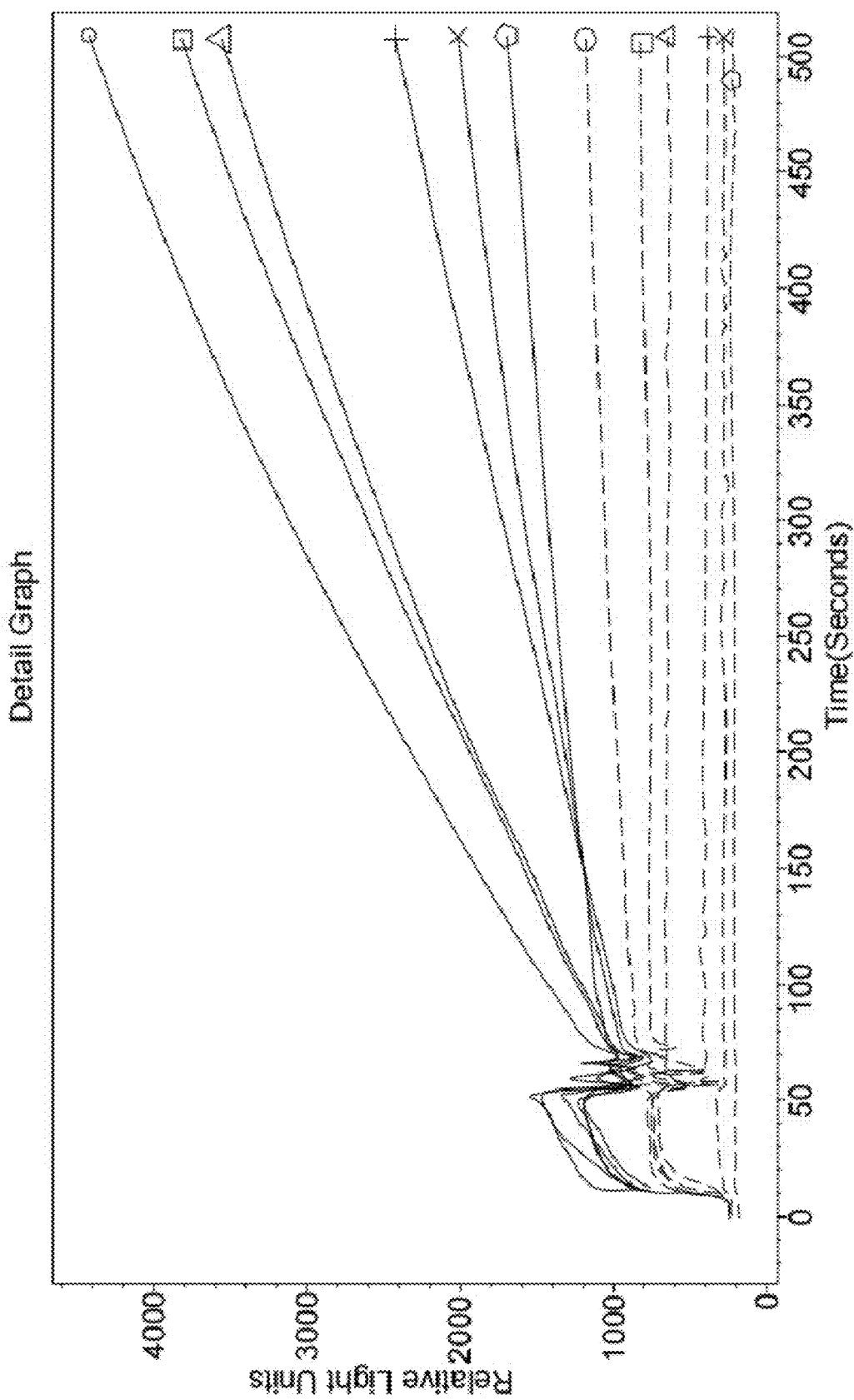
FIG. 22 and FIG. 23 show the effects of a composite reaction of the EGTA solution and the $CaCl_2$ solution on the calcium signals in the protoplasts of the *Primula rupestris* petals.
Figure 23:
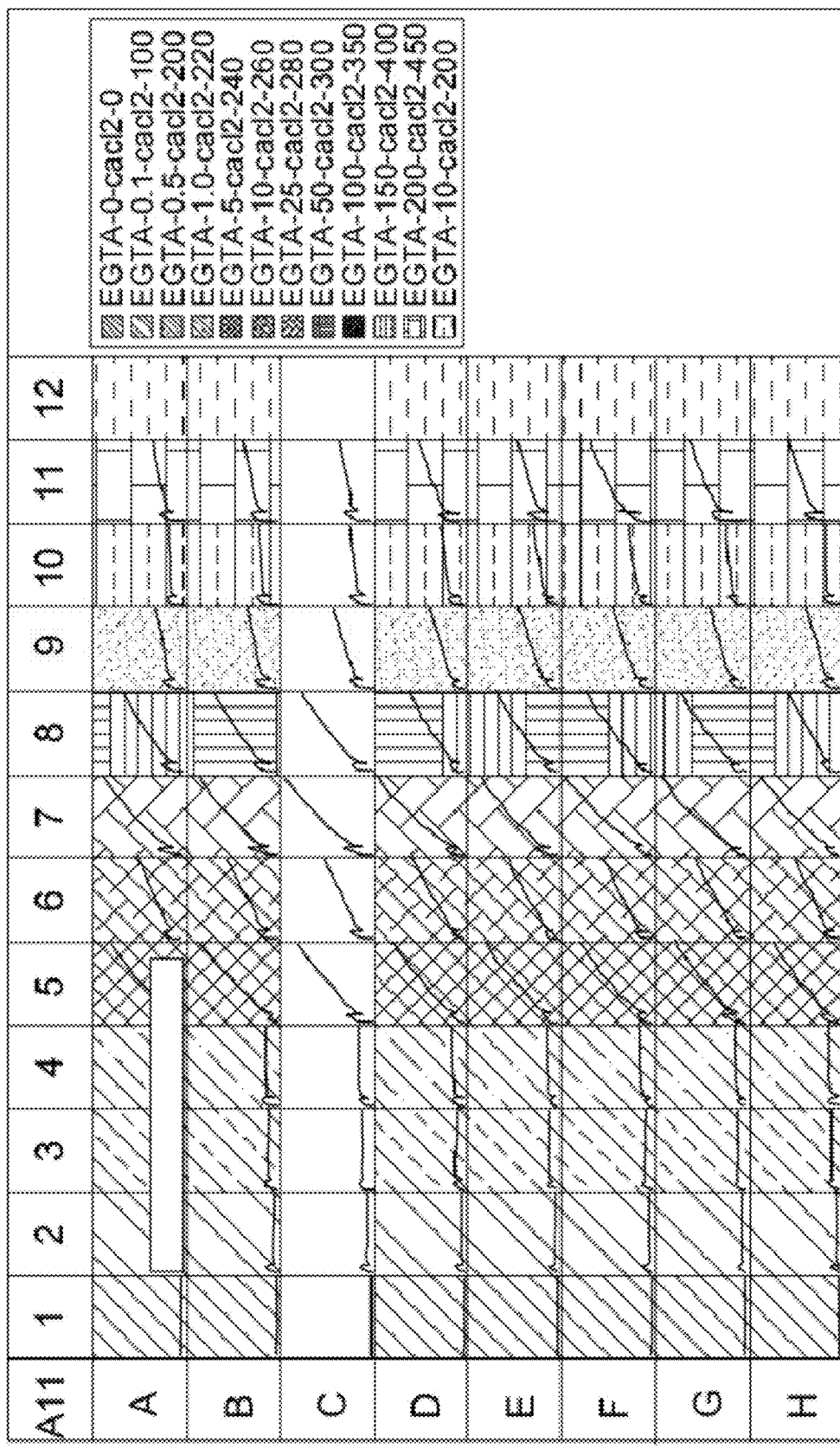

The results of Examples 19 to 25 and Comparative Examples 10 to 14 are shown in FIG. 22 to FIG. 23. Since the legend is not fully marked when FIG. 23 is exported, the detailed concentrations of the EGTA solution and the CaCl$_2$ solution correspond to Table 7. The order of concentrations from top to bottom in the legend on the right in FIG. 23 corresponds to the sequence numbers from left to right at the top of FIG. 23, which in turn corresponds to the same sequence numbers in Table 7. For example, the upper sequence number 1 in FIG. 23 corresponds to the sequence number 1 in Table 7.

It can be seen from FIG. 22 to FIG. 23 that the exogenous calcium signal can trigger the change of the fluorescence of the FLIPR calcium signal, and the EGTA can chelate the change of the fluorescence caused by the exogenous calcium signal.

EXAMPLES 26 to 33 AND COMPARATIVE EXAMPLES 15 to 18

Figure 24:
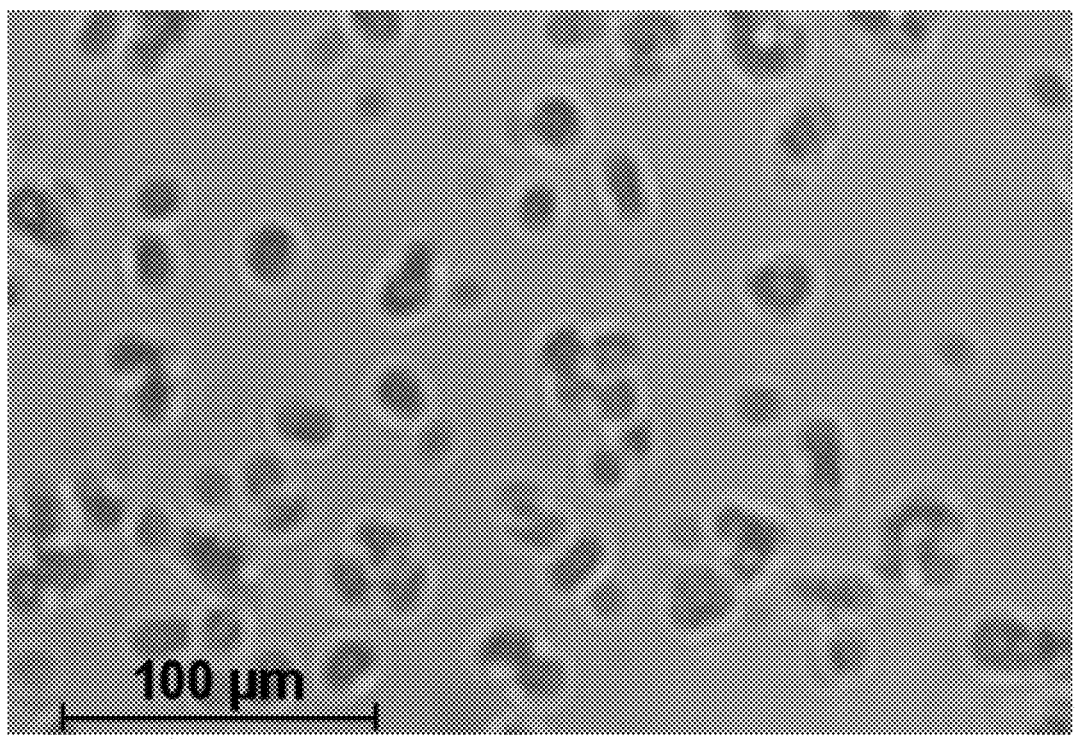
FIG. 24 is a protoplast map of valerian leaves.

The protoplasts of valerian leaves were extracted using the same method as Example 1, and the protoplast results are shown in FIG. 24.

It can be seen from FIG. 24 that the protoplasts obtained by the method for extracting the plant protoplasts provided by the present disclosure are approximately circular, with a large number and few fragments.

Figure 25:
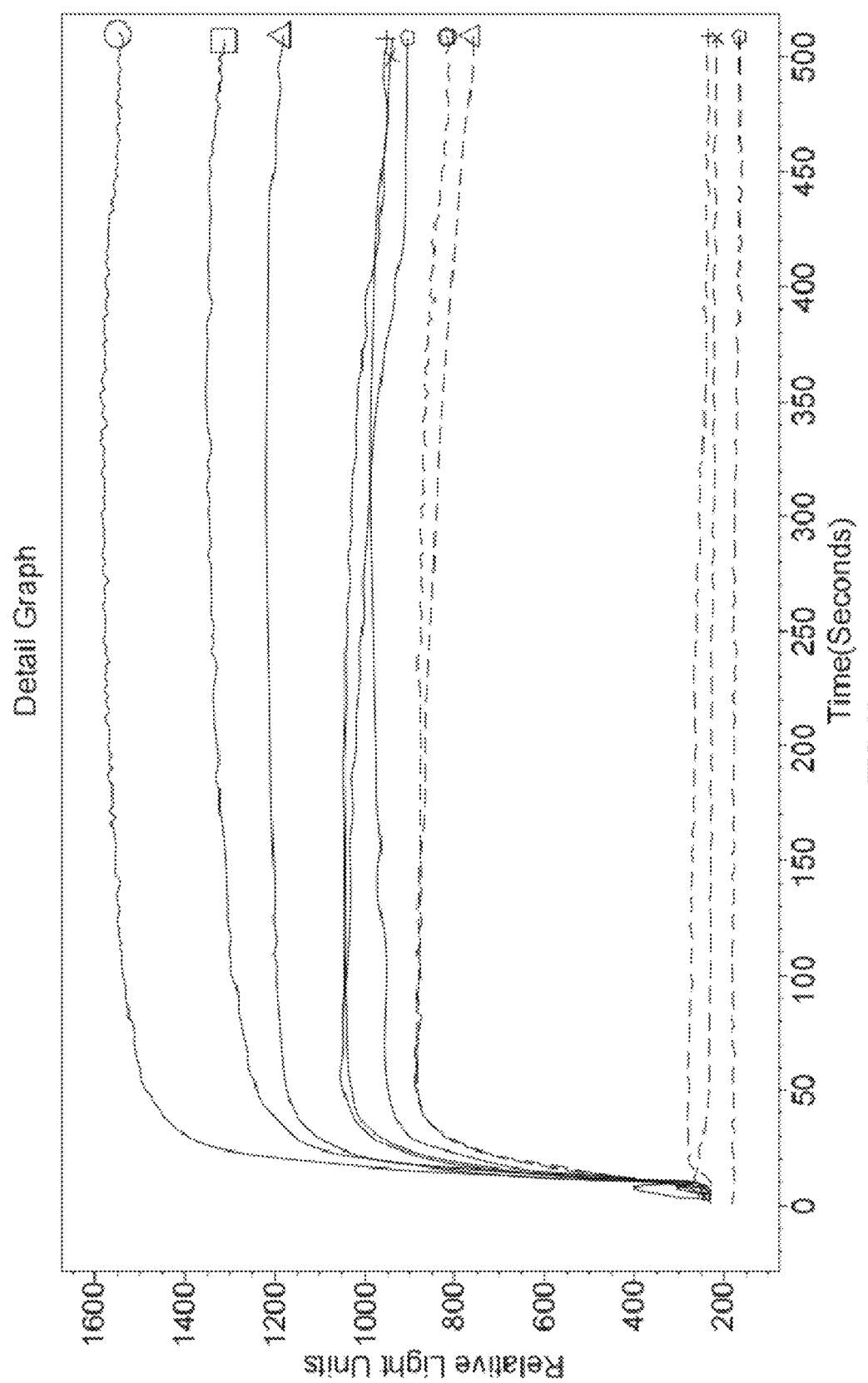
FIG. 25 and FIG. 26 show the effects of different concentrations of $CaCl_2$ solutions on calcium signals in protoplasts of the valerian leaves.
Figure 26:
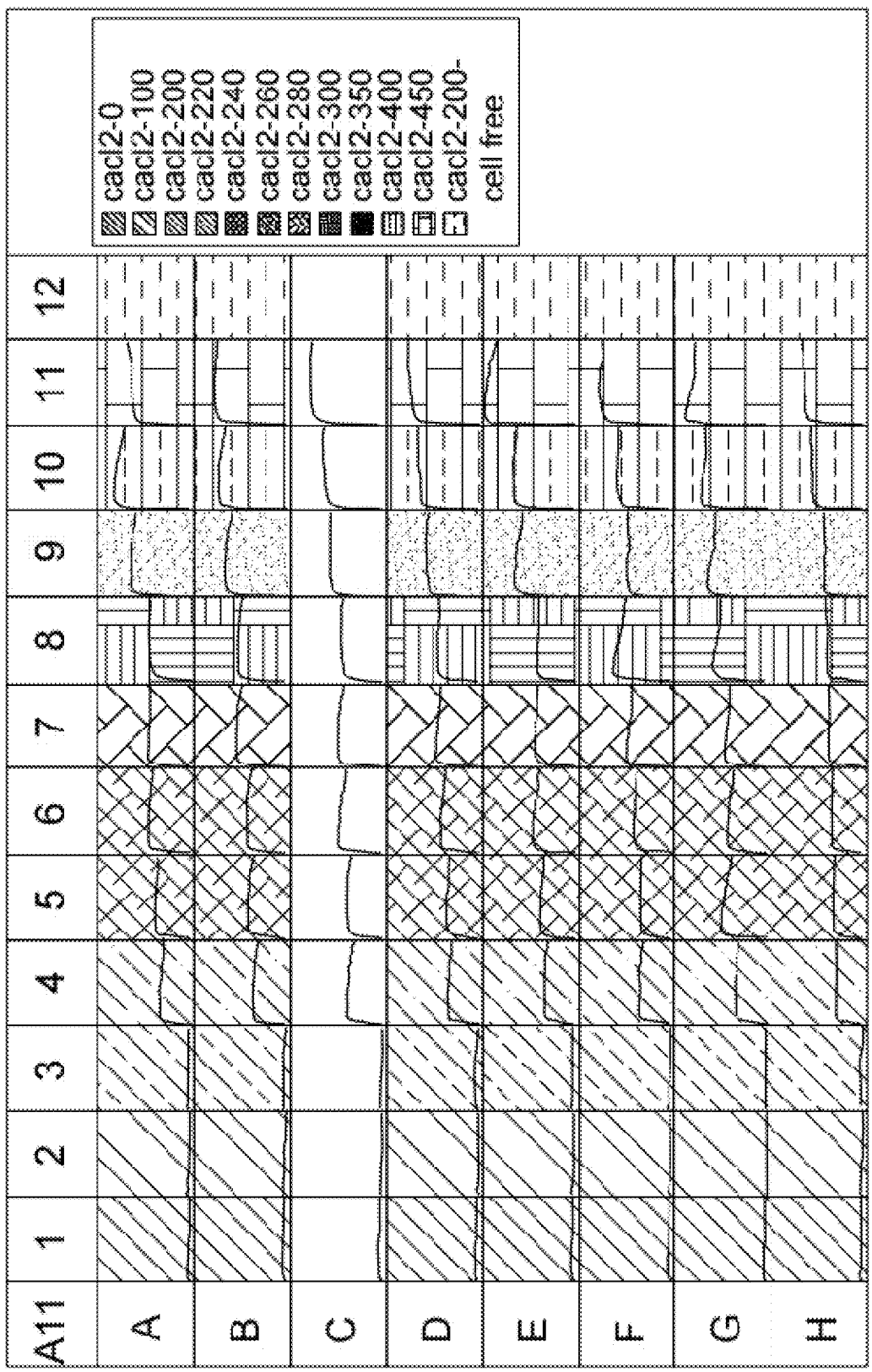

Using the method in Example 2, it is confirmed that when the exogenous calcium signal stimulation solution-CaCl$_2$ solution of the protoplasts of the valerian leaves has a concentration of 220 mM, the calcium signal surges significantly (see FIG. 25 to FIG. 26). It can be seen from FIG. 25 to FIG. 26 that when the CaCl$_2$ has a concentration of 220-450 mM (corresponding to the 4th to 11th columns in FIG. 26), the calcium signal changes significantly in the protoplasts of the valerian leaves.

Figure 27:
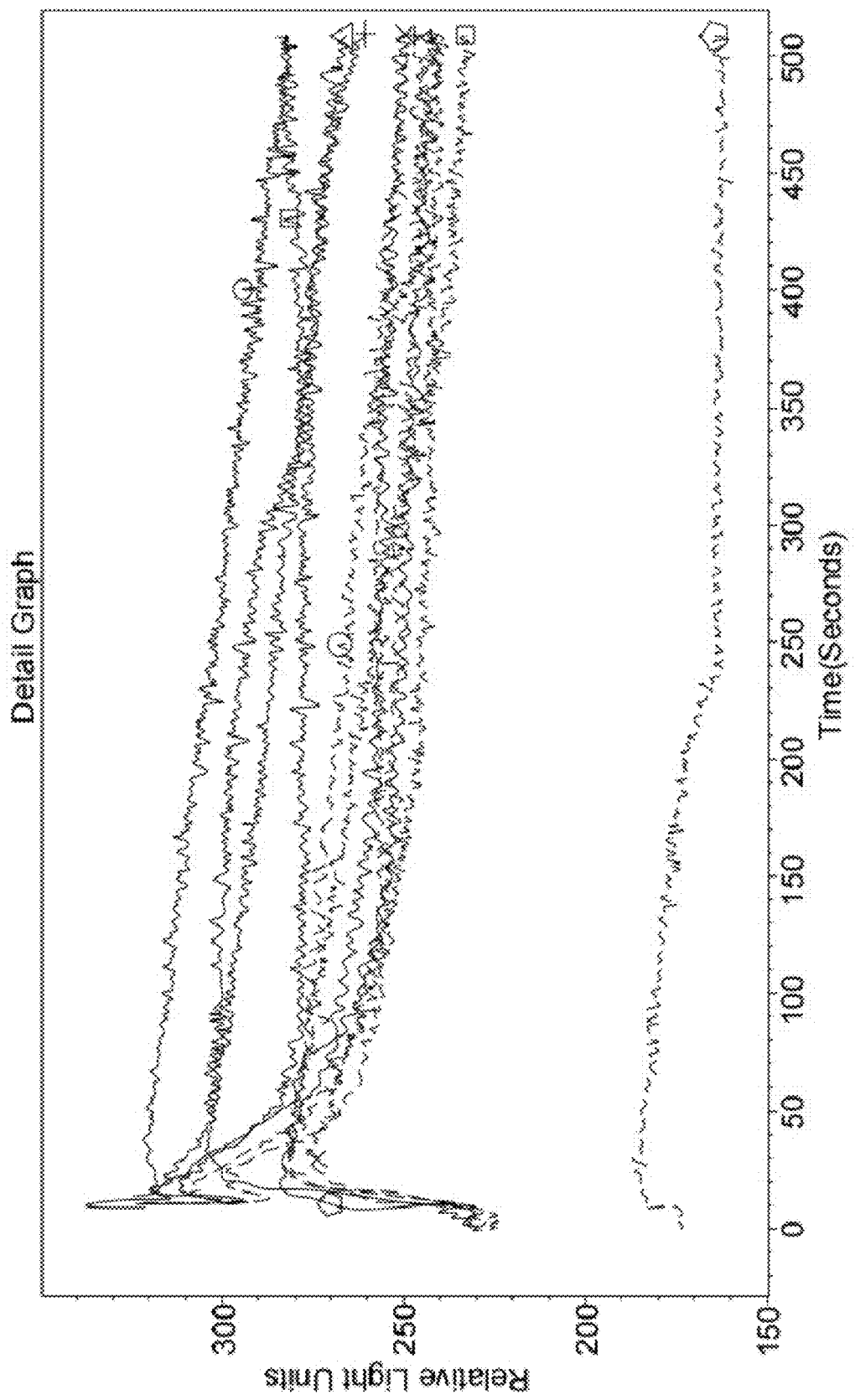
FIG. 27 and FIG. 28 show the chelation effects of different concentrations of ETGA solutions on the calcium signals in the protoplasts of the valerian leaves.
Figure 28:
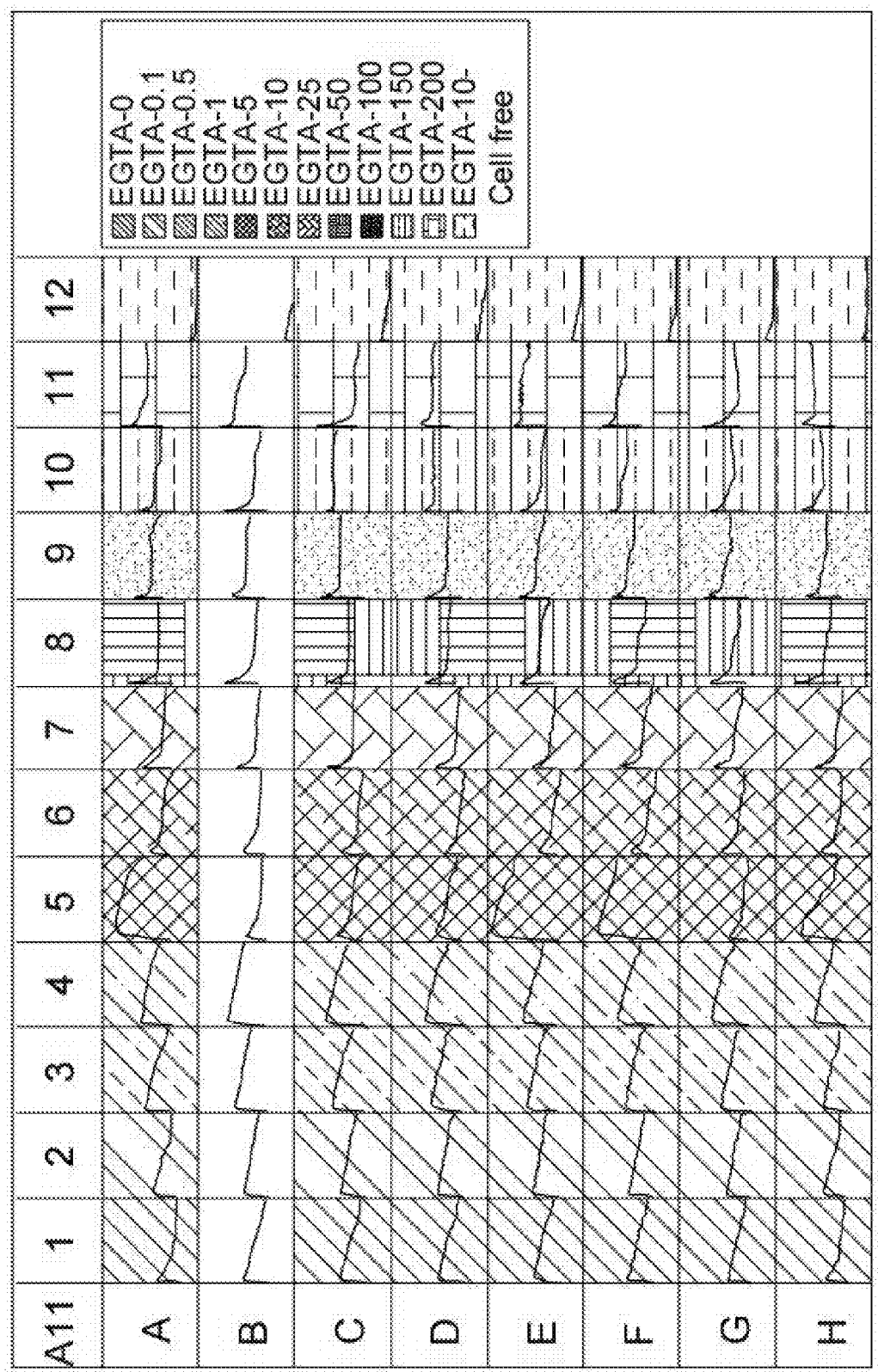

Using the method in Example 3, it is confirmed that the calcium signal chelator-EGTA solution of the protoplasts of the valerian leaves has a concentration of 0.1-200 μM, as shown in FIG. 27 to FIG. 28 (corresponding to the 2nd to 11th columns in FIG. 28).

According to the method in Example 4, the EGTA solution and the CaCl$_2$ solution were combined to treat the change of the protoplasts of the valerian leaves, and the parameters of the examples and comparative examples are shown in Table 8:

TABLE 8

Parameter settings in Examples 26 to 33 and Comparative Examples 15 to 18

|  | EGTA solution (μM) | CaCl$_2$ solution (μM) | SN |
|---|---|---|---|
| Example 26 | 1 | 220 | 4 |
| Example 27 | 5 | 240 | 5 |
| Example 28 | 10 | 260 | 6 |
| Example 29 | 25 | 280 | 7 |
| Example 30 | 50 | 300 | 8 |
| Example 31 | 100 | 350 | 9 |
| Example 32 | 150 | 400 | 10 |
| Example 33 | 200 | 450 | 11 |
| Comparative Example 15 | 0 | 0 | 1 |
| Comparative Example 16 | 0.1 | 100 | 2 |
| Comparative Example 17 | 0.5 | 200 | 3 |
| Comparative Example 18 | 10 | 200 | 12 |

Figure 29:
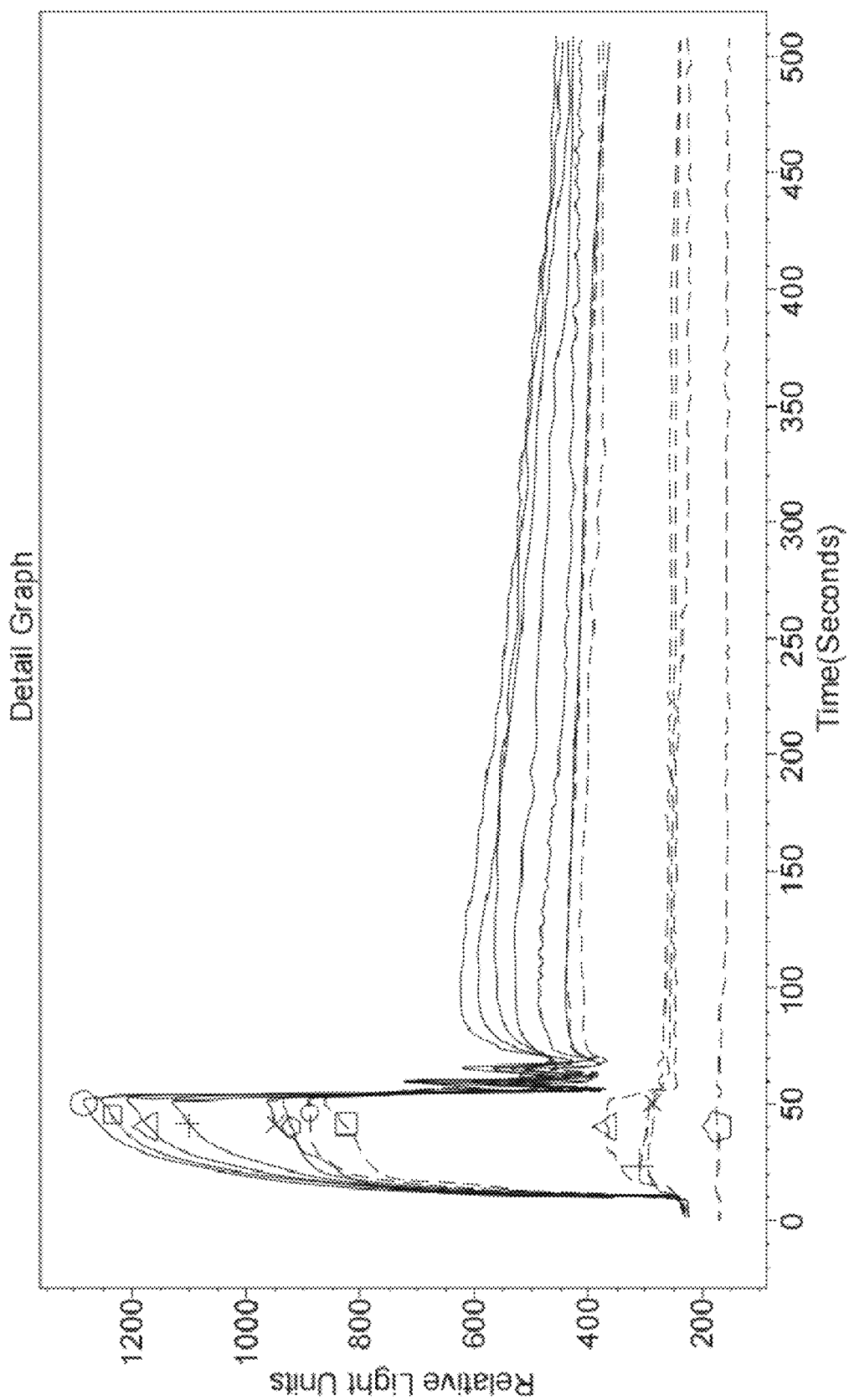
FIG. 29 and FIG. 30 show the effects of a composite reaction of the EGTA solution and the $CaCl_2$ solution on the calcium signals in the protoplasts of the valerian leaves.
Figure 30:
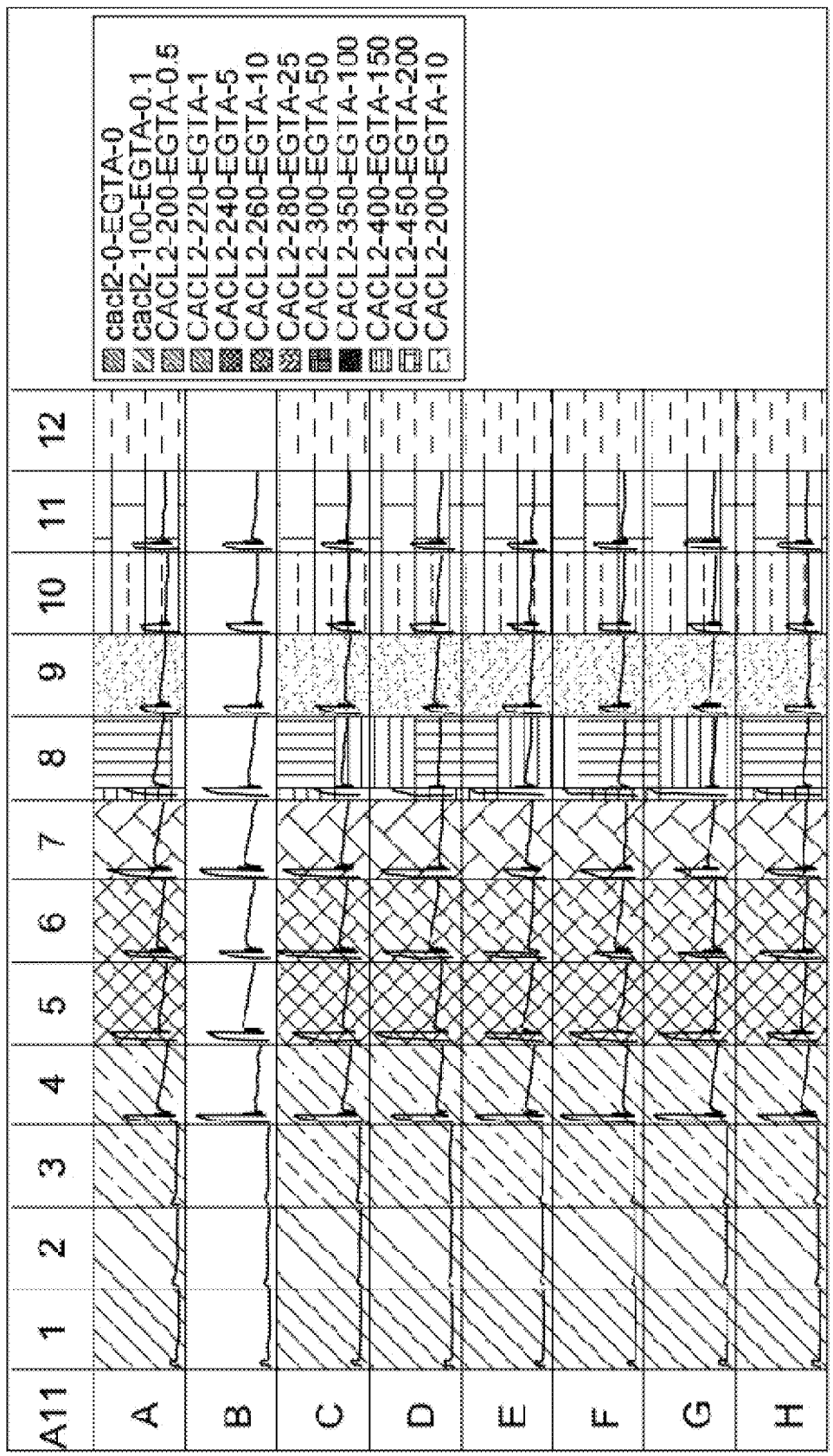

The results of Examples 26 to 33 and Comparative Examples 15 to 18 are shown in FIG. 29 to FIG. 30. Since the legend is not fully marked when FIG. 30 is exported, the detailed concentrations of the EGTA solution and the CaCl$_2$ solution correspond to Table 8. The order of concentrations from top to bottom in the legend on the right in FIG. 30 corresponds to the sequence numbers from left to right at the top of FIG. 30, which in turn corresponds to the same sequence numbers in Table 8. For example, the upper sequence number 1 in FIG. 30 corresponds to the sequence number 1 in Table 8.

It can be seen from FIG. 29 to FIG. 30 that the exogenous calcium signal can trigger the change of the fluorescence of the FLIPR calcium signal, and the EGTA can chelate the change of the fluorescence caused by the exogenous calcium signal.

It can be seen from the above examples that the calcium signals in the plants can be detected by the FLIPR by using the method provided by the present disclosure, and the FLIPR can be applied to plant protoplasts for the detection of calcium signals.

Although the above examples have described the present disclosure in a thorough manner, it is only some but not all examples of the present disclosure, and other examples may be obtained without inventive step according to the present examples, all of which fall within the scope of protection of the present disclosure.

What is claimed is:

1. A sample pretreatment method for detecting calcium signals in plants based on a fluorescent imaging plate reader (FLIPR), the method comprising the following steps: mixing plant protoplasts with a calcium dye to obtain a first mixture; and mixing the first mixture with a calcium signal chelator and an exogenous calcium signal stimulation solution, and conducting incubation and a first centrifugation on an obtained second mixture to obtain a sample to be loaded.

2. The sample pretreatment method according to claim 1, wherein the plant protoplasts and the calcium dye have a volume ratio of (0.1-10):(0.5-5).

3. The sample pretreatment method according to claim 1, wherein the calcium signal chelator comprises one or more selected from the group consisting of an ethylene glycol tetraacetic acid (EGTA) solution, ethylenediamine, and 2,2'-bipyridine; and the exogenous calcium signal stimulation solution comprises one or more selected from the group consisting of a CaCl$_2$ solution, a CaCO$_3$ solution, and a Ca$_2$NO$_3$ solution.

4. The sample pretreatment method according to claim 3, wherein when the calcium signal chelator is the EGTA solution and the exogenous calcium signal stimulation solution is the CaCl$_2$ solution, a total volume of the EGTA solution and the CaCl$_2$ solution and a volume of the first mixture have a ratio of (0.1-6):(1-15).

5. The sample pretreatment method according to claim 4, wherein the EGTA solution has a molar concentration of 5-200 μM; and the CaCl$_2$ solution has a molar concentration of 220-450 mM.

6. The sample pretreatment method according to claim 1, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein
the plant tissues and the lysis buffer have a mass/volume ratio of (0.1-10) g:(1.0-30) mL.

7. The sample pretreatment method according to claim 2, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein
the plant tissues and the lysis buffer have a mass/volume ratio of (0.1-10) g:(1.0-30) mL.

8. The sample pretreatment method according to claim 3, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein
the plant tissues and the lysis buffer have a mass/volume ratio of (0.1-10) g:(1.0-30) mL.

9. The sample pretreatment method according to claim 4, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein
the plant tissues and the lysis buffer have a mass/volume ratio of (0.1-10) g:(1.0-30) mL.

10. The sample pretreatment method according to claim 5, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein
the plant tissues and the lysis buffer have a mass/volume ratio of (0.1-10) g:(1.0-30) mL.

11. The sample pretreatment method according to claim 6, wherein the lysis buffer comprises the following components: 1% of cellulase, 1% of pectinase, 0.7 mol/L of mannitol, 0.7 mmol/L of KH$_2$PO$_4$, and 10 mmol/L of CaCl$_2$·2H$_2$O, and the lysis buffer has a pH of 6.8-7.0.

12. A method for detecting calcium signals in plants based on a FLIPR, wherein the sample to be loaded obtained by the sample pretreatment method according to claim 1 is loaded on a machine, and a FLIPR high-throughput real-time fluorescence detection and analysis system is used to detect calcium signals in the sample to be loaded.

13. The method according to claim 12, wherein the plant protoplasts and the calcium dye have a volume ratio of (0.1-10):(0.5-5).

14. The method according to claim 12, wherein the calcium signal chelator comprises one or more selected from the group consisting of an ethylene glycol tetraacetic acid (EGTA) solution, ethylenediamine, and 2,2'-bipyridine; and the exogenous calcium signal stimulation solution comprises one or more selected from the group consisting of a CaCl$_2$ solution, a CaCO$_3$ solution, and a Ca$_2$NO$_3$ solution.

15. The method according to claim 14, wherein when the calcium signal chelator is the EGTA solution and the exogenous calcium signal stimulation solution is the CaCl$_2$ solution, a total volume of the EGTA solution and the CaCl$_2$ solution and a volume of the first mixture have a ratio of (0.1-6):(1-15).

16. The method according to claim 15, wherein the EGTA solution has a molar concentration of 5-200 μM; and the CaCl$_2$ solution has a molar concentration of 220-450 mM.

17. The method according to claim 12, wherein a method for extracting the plant protoplasts comprises the following steps:
mixing plant tissues with a lysis buffer, lysing for 5 to 7 hours, and conducting filtration and second centrifugation to obtain a plant tissue lysate;
mixing the plant tissue lysate with a cell protoplast washing (CPW) lotion with a mass concentration of 5-20%, and conducting third centrifugation to obtain a protoplast lotion mixture; and
placing the protoplast lotion mixture on a surface of a sucrose solution with a mass concentration of 0.5-50%, and conducting fourth centrifugation to obtain the plant protoplasts, wherein the plant tissues and the lysis buffer have a mass/volume ratio of (0.1-10) g:(1.0-30) mL.

18. The method according to claim 17, wherein the lysis buffer comprises the following components: 1% of cellulase, 1% of pectinase, 0.7 mol/L of mannitol, 0.7 mmol/L of $KH_2PO_4$, and 10 mmol/L of $CaCl_2 \cdot 2H_2O$, and the lysis buffer has a pH of 6.8-7.0.

19. The method according to claim 12, wherein the plants comprise *Primula* plants, *Valeriana* plants, *Nicotiana* plants, and *Arabidopsis* plants.

20. The method according to claim 19, wherein the *Primula* plants comprise primula, the *Valeriana* plants comprise valerian, the *Nicotiana* plants comprise tobacco, and the *Arabidopsis* plants comprise arabidopsis.

* * * * *